US012719541B2

(12) United States Patent
Hindy et al.

(10) Patent No.: US 12,719,541 B2
(45) Date of Patent: Aug. 25, 2026

(54) CONFIGURING A CHANNEL STATE INFORMATION REPORT

(71) Applicant: Lenovo (Singapore) Pte. Ltd., New Tech Park (SG)

(72) Inventors: Ahmed Monier Ibrahim Saleh Hindy, Aurora, IL (US); Vijay Nangia, Woodridge, IL (US); Majid Ghanbarinejad, Chicago, IL (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 393 days.

(21) Appl. No.: 18/258,617

(22) PCT Filed: Dec. 17, 2021

(86) PCT No.: PCT/IB2021/061894

§ 371 (c)(1),
(2) Date: Jun. 21, 2023

(87) PCT Pub. No.: WO2022/137048

PCT Pub. Date: Jun. 30, 2022

(65) Prior Publication Data

US 2024/0048202 A1 Feb. 8, 2024

Related U.S. Application Data

(60) Provisional application No. 63/128,729, filed on Dec. 21, 2020.

(51) Int. Cl.
*H04L 5/00* (2006.01)
*H04B 7/06* (2006.01)

(52) U.S. Cl.
CPC ......... *H04B 7/0626* (2013.01); *H04B 7/0639* (2013.01); *H04B 7/0641* (2013.01); *H04B 7/0645* (2013.01)

(58) Field of Classification Search
CPC .. H04B 7/0626; H04B 7/0632; H04B 7/0639; H04B 7/0641; H04B 7/0645; H04L 5/0023; H04L 5/0051; H04L 5/0057
See application file for complete search history.

(56) References Cited

U.S. PATENT DOCUMENTS 9,973,955 B2 * 5/2018 Liu ........................ H04W 24/10
10,200,103 B2 * 2/2019 Rahman ............... H04B 7/0478
(Continued)

FOREIGN PATENT DOCUMENTS

CN 116326003 A * 6/2023 ........... H04L 1/1671

OTHER PUBLICATIONS

PCT/IB2021/061894, "Notification of Transmittal of the International Search Report and the Written Opinion of the International Searching Authority, or the Declaration", International Searching Authority, May 16, 2022, pp. 1-20.
(Continued)

*Primary Examiner* — Phuc H Tran
(74) *Attorney, Agent, or Firm* — Kunzler Needham & Hilton; Bruce R. Needham

(57) ABSTRACT

Apparatuses, methods, and systems for configuring a channel state information (CSI) report. One method includes receiving an indication of CSI configuration measurement and/or reporting for a high-speed user equipment. The method includes receiving a CSI measurement configuration based on a reference signal resource with a resource setting. The method includes generating a set of CSI feedback parameters based on a report setting configuring a user equipment for CSI reporting. The method includes identifying a combination of parameters. Each combination of parameters of includes a report setting, a resource setting, and a CSI feedback report format. The method includes transmitting a set of CSI reports to a network. Each CSI (Continued)

report: corresponds to a configuration mode having a primary and secondary configuration mode; includes at least one type of a codebook configured via a codebook configuration; and includes a CSI part.

17 Claims, 7 Drawing Sheets

(56) References Cited

U.S. PATENT DOCUMENTS

2016/0149628 A1* 5/2016 Davydov ................ H04L 5/001 370/329
2019/0109626 A1* 4/2019 Park ..................... H04B 7/0626
2020/0412431 A1* 12/2020 Park ..................... H04B 7/0469
2021/0289441 A1* 9/2021 Li ..................... H04W 52/0229
2022/0006496 A1* 1/2022 Park ........................ H04L 5/005
2022/0255604 A1* 8/2022 Wu ...................... H04B 7/0639
2023/0170963 A1* 6/2023 Wu ...................... H04B 7/0626 370/329

OTHER PUBLICATIONS

Samsung et al., "WF on Type I and II CSI codebooks", 3GPP TSG-RAN WG1 #89 R1-1709232, May 15-19, 2017, pp. 1-24.

3GPP, "3rd Generation Partnership Project; Technical Specification Group Radio Access Network; NR; Physical layer procedures for data (Release 16)", 3GPP TS 38.214 V16.3.0, Sep. 2020, pp. 1-166.

3GPP, "3rd Generation Partnership Project; Technical Specification Group Radio Access Network; NR; Medium Access Control (MAC) protocol specification (Release 16)", 3GPP TS 38.321 V16.2.0, Sep. 2020, pp. 1-154.

3GPP, "3rd Generation Partnership Project; Technical Specification Group Radio Access Network; NR; Radio Resource Control (RRC) protocol specification (Release 16)", 3GPP TS 38.331 V16.3.0, Dec. 2020, pp. 1-932.

* cited by examiner

```
-- ASN1START
-- TAG-CSI-REPORTCONFIG-START

CSI-ReportConfig ::=                  SEQUENCE {
    reportConfigId                            CSI-ReportConfigId,
    carrier                                   ServCellIndex             OPTIONAL,   -- Need S
    resourcesForChannelMeasurement            CSI-ResourceConfigId,
    csi-IM-ResourcesForInterference           CSI-ResourceConfigId      OPTIONAL,   -- Need R
    nzp-CSI-RS-ResourcesForInterference       CSI-ResourceConfigId      OPTIONAL,   -- Need R
    resourcesForChannelMeasurement-r18        CSI-ResourceConfigId      OPTIONAL,   -- Need R
    csi-IM-ResourcesForInterference-r18       CSI-ResourceConfigId      OPTIONAL,   -- Need R
    nzp-CSI-RS-ResourcesForInterference-r18   CSI-ResourceConfigId      OPTIONAL,   -- Need R

    reportConfigType                        CHOICE {
        periodic                              SEQUENCE {
            reportSlotConfig                  CSI-ReportPeriodicityAndOffset,
            pucch-CSI-ResourceList            SEQUENCE (SIZE (1..maxNrofBWPs)) OF PUCCH-CSI-Resource
        },
        semiPersistentOnPUCCH                 SEQUENCE {
            reportSlotConfig                  CSI-ReportPeriodicityAndOffset,
            pucch-CSI-ResourceList            SEQUENCE (SIZE (1..maxNrofBWPs)) OF PUCCH-CSI-Resource
        },
        semiPersistentOnPUSCH                SEQUENCE {
            reportSlotConfig                 ENUMERATED {sl5, sl10, sl20, sl40, sl80, sl160, sl320},
            reportSlotOffsetList             SEQUENCE (SIZE (1.. maxNrofUL-Allocations)) OF INTEGER(0..32),
            p0alpha                                 P0-PUSCH-AlphaSetId
        },
        aperiodic                            SEQUENCE {
            reportSlotOffsetList             SEQUENCE (SIZE (1..maxNrofUL-Allocations)) OF INTEGER(0..32)
        }
    },
    HighSpeedCSIEnabled                     ENUMERATED (TRUE)         OPTIONAL,  -- Need R

                                           [...]

-- TAG-CSI-REPORTCONFIG-STOP
-- ASN1STOP
```

```
-- ASN1START
-- TAG-CSI-RESOURCECONFIG-START

CSI-ResourceConfig ::=      SEQUENCE {
    csi-ResourceConfigId        CSI-ResourceConfigId,
    csi-RS-ResourceSetList      CHOICE {
        nzp-CSI-RS-SSB              SEQUENCE {
            nzp-CSI-RS-ResourceSetList  SEQUENCE (SIZE (1..maxNrofNZP-CSI-RS-ResourceSetsPerConfig))
OF NZP-CSI-RS-ResourceSetId   OPTIONAL, -- Need R
            csi-SSB-ResourceSetList     SEQUENCE (SIZE (1..maxNrofCSI-SSB-ResourceSetsPerConfig)) OF
CSI-SSB-ResourceSetId         OPTIONAL  -- Need R
        },
        csi-IM-ResourceSetList      SEQUENCE (SIZE (1..maxNrofCSI-IM-ResourceSetsPerConfig)) OF CSI-
IM-ResourceSetId
    },

    bwp-Id                      BWP-Id,
    resourceType                ENUMERATED {aperiodic, semiPersistent, periodic},
    resourceType-r18            ENUMERATED {aperiodic, semiPersistent, periodic}   OPTIONAL,-- Need R
    ...
}

-- TAG-CSI-RESOURCECONFIG-STOP
-- ASN1STOP
```

FIG. 5

CONFIGURING A CHANNEL STATE INFORMATION REPORT

CROSS-REFERENCE TO RELATED APPLICATIONS

This application claims priority to U.S. Patent Application Ser. No. 63/128,729 entitled "APPARATUSES, METHODS, AND SYSTEMS FOR A NOVEL CODEBOOK FOR HIGH-SPEED USER SCENARIOS" and filed on Dec. 21, 2020 for Ahmed Monier Ibrahim Saleh Hindy, which is incorporated herein by reference in its entirety.

FIELD

The subject matter disclosed herein relates generally to wireless communications and more particularly relates to configuring a channel state information report.

BACKGROUND

In certain wireless communications networks, channel state information reports may be made. In such networks, devices moving at high speeds may be used.

BRIEF SUMMARY

Methods for configuring a channel state information report are disclosed. Apparatuses and systems also perform the functions of the methods. One embodiment of a method includes receiving, at a user equipment, an indication of channel state information configuration measurement, channel state information reporting, or a combination thereof for a high-speed user equipment. In some embodiments, the method includes receiving a channel state information measurement configuration based on at least one reference signal resource with at least one resource setting. In certain embodiments, the method includes generating a set of channel state information feedback parameters based on at least one report setting configuring the user equipment for channel state information reporting. In various embodiments, the method includes identifying at least one combination of parameters. Each combination of parameters of the at least one combination of parameters includes a report setting of the at least one report setting and a resource setting of the at least one resource setting, and each combination of parameters corresponds to a channel state information feedback report format. In some embodiments, the method includes transmitting a set of at least one channel state information report of the plurality of channel state information reports to a network. Each channel state information report of the at least one channel state information report: corresponds to a configuration mode of a plurality of configuration modes, wherein the plurality of configuration modes comprises a primary configuration mode and a secondary configuration mode; includes at least one type of a codebook configured via a codebook configuration; and includes at least one channel state information part.

One apparatus for configuring a channel state information report includes a user equipment. In some embodiments, the apparatus includes a receiver that: receives an indication of channel state information configuration measurement, channel state information reporting, or a combination thereof for a high-speed user equipment; and receives a channel state information measurement configuration based on at least one reference signal resource with at least one resource setting. In various embodiments, the apparatus includes a processor that: generates a set of channel state information feedback parameters based on at least one report setting configuring the user equipment for channel state information reporting; and identifies at least one combination of parameters. Each combination of parameters of the at least one combination of parameters comprises a report setting of the at least one report setting and a resource setting of the at least one resource setting, and each combination of parameters corresponds to a channel state information feedback report format. In certain embodiments, the apparatus includes a transmitter that transmits a set of at least one channel state information report of the plurality of channel state information reports to a network. Each channel state information report of the at least one channel state information report: corresponds to a configuration mode of a plurality of configuration modes, wherein the plurality of configuration modes comprises a primary configuration mode and a secondary configuration mode; includes at least one type of a codebook configured via a codebook configuration; and includes at least one channel state information part.

Another embodiment of a method for configuring a channel state information report includes transmitting, at a network device, an indication of channel state information configuration measurement, channel state information reporting, or a combination thereof for a high-speed user equipment. In some embodiments, the method includes transmitting a channel state information measurement configuration based on at least one reference signal resource with at least one resource setting. In certain embodiments, the method includes receiving a set of at least one channel state information report of a plurality of channel state information reports. Each channel state information report of the at least one channel state information report: corresponds to a configuration mode of a plurality of configuration modes, wherein the plurality of configuration modes comprises a primary configuration mode and a secondary configuration mode; includes at least one type of a codebook configured via a codebook configuration; and includes at least one channel state information part.

Another apparatus for configuring a channel state information report includes a network device. In some embodiments, the apparatus includes a transmitter that: transmits an indication of channel state information configuration measurement, channel state information reporting, or a combination thereof for a high-speed user equipment; and transmits a channel state information measurement configuration based on at least one reference signal resource with at least one resource setting. In various embodiments, the apparatus includes a receiver that receives a set of at least one channel state information report of a plurality of channel state information reports. Each channel state information report of the at least one channel state information report: corresponds to a configuration mode of a plurality of configuration modes, wherein the plurality of configuration modes comprises a primary configuration mode and a secondary configuration mode; includes at least one type of a codebook configured via a codebook configuration; and includes at least one channel state information part.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which:

FIG. 4 is a schematic block diagram illustrating one embodiment of ASN.1 code for CSI report and/or resource setup;

FIG. 5 is a schematic block diagram illustrating another embodiment of ASN.1 code for CSI report and/or resource setup;

DETAILED DESCRIPTION

Figure 1:
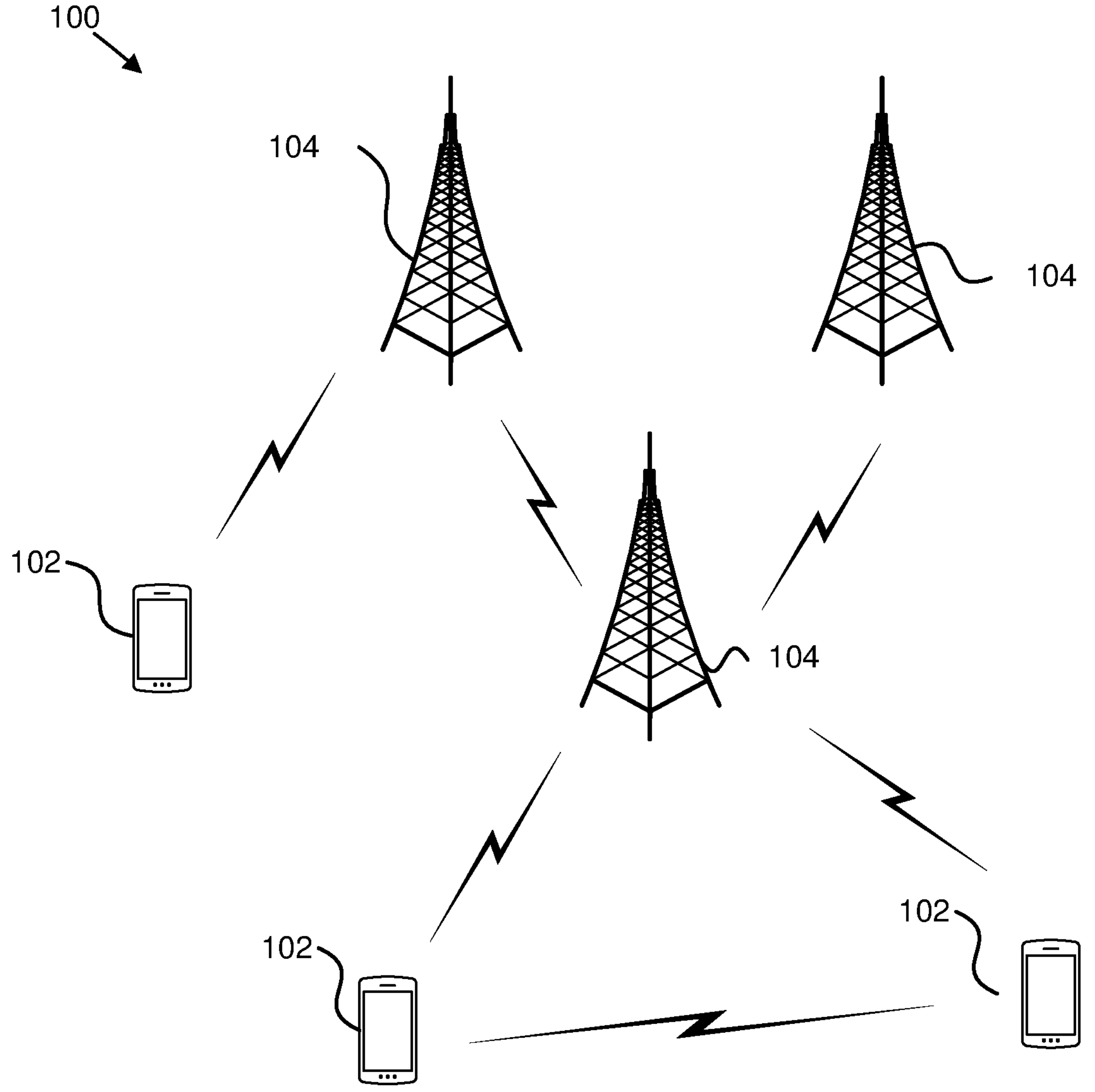
FIG. 1 is a schematic block diagram illustrating one embodiment of a wireless communication system for configuring a channel state information report.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Certain of the functional units described in this specification may be labeled as modules, in order to more particularly emphasize their implementation independence. For example, a module may be implemented as a hardware circuit comprising custom very-large-scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but may include disparate instructions stored in different locations which, when joined logically together, include the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be any number of lines and may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. The code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

FIG. 1 depicts an embodiment of a wireless communication system 100 for configuring a channel state information report. In one embodiment, the wireless communication system 100 includes remote units 102 and network units 104. Even though a specific number of remote units 102 and network units 104 are depicted in FIG. 1, one of skill in the art will recognize that any number of remote units 102 and network units 104 may be included in the wireless communication system 100.

In one embodiment, the remote units 102 may include computing devices, such as desktop computers, laptop computers, personal digital assistants ("PDAs"), tablet computers, smart phones, smart televisions (e.g., televisions connected to the Internet), set-top boxes, game consoles, security systems (including security cameras), vehicle on-board computers, network devices (e.g., routers, switches, modems), aerial vehicles, drones, or the like. In some embodiments, the remote units 102 include wearable devices, such as smart watches, fitness bands, optical head-mounted displays, or the like. Moreover, the remote units 102 may be referred to as subscriber units, mobiles, mobile stations, users, terminals, mobile terminals, fixed terminals, subscriber stations, UE, user terminals, a device, or by other terminology used in the art. The remote units 102 may communicate directly with one or more of the network units 104 via UL communication signals. In certain embodiments, the remote units 102 may communicate directly with other remote units 102 via sidelink communication.

The network units 104 may be distributed over a geographic region. In certain embodiments, a network unit 104 may also be referred to and/or may include one or more of an access point, an access terminal, a base, a base station, a location server, a core network ("CN"), a radio network entity, a Node-B, an evolved node-B ("eNB"), a 5G node-B ("gNB"), a Home Node-B, a relay node, a device, a core network, an aerial server, a radio access node, an access point ("AP"), new radio ("NR"), a network entity, an access and mobility management function ("AMF"), a unified data management ("UDM"), a unified data repository ("UDR"), a UDM/UDR, a policy control function ("PCF"), a radio access network ("RAN"), a network slice selection function ("NSSF"), an operations, administration, and management ("OAM"), a session management function ("SMF"), a user plane function ("UPF"), an application function, an authentication server function ("AUSF"), security anchor functionality ("SEAF"), trusted non-3GPP gateway function ("TNGF"), or by any other terminology used in the art. The network units 104 are generally part of a radio access network that includes one or more controllers communicably coupled to one or more corresponding network units 104. The radio access network is generally communicably coupled to one or more core networks, which may be coupled to other networks, like the Internet and public switched telephone networks, among other networks. These and other elements of radio access and core networks are not illustrated but are well known generally by those having ordinary skill in the art.

In one implementation, the wireless communication system 100 is compliant with NR protocols standardized in third generation partnership project ("3GPP"), wherein the network unit 104 transmits using an OFDM modulation scheme on the downlink ("DL") and the remote units 102 transmit on the uplink ("UL") using a single-carrier frequency division multiple access ("SC-FDMA") scheme or an orthogonal frequency division multiplexing ("OFDM") scheme. More generally, however, the wireless communication system 100 may implement some other open or proprietary communication protocol, for example, WiMAX, institute of electrical and electronics engineers ("IEEE") 802.11 variants, global system for mobile communications ("GSM"), general packet radio service ("GPRS"), universal mobile telecommunications system ("UMTS"), long term evolution ("LTE") variants, code division multiple access 2000 ("CDMA2000"), Bluetooth®, ZigBee, Sigfoxx, among other protocols. The present disclosure is not intended to be limited to the implementation of any particular wireless communication system architecture or protocol.

The network units 104 may serve a number of remote units 102 within a serving area, for example, a cell or a cell sector via a wireless communication link. The network units 104 transmit DL communication signals to serve the remote units 102 in the time, frequency, and/or spatial domain.

In various embodiments, a remote unit 102 may receive an indication of channel state information configuration measurement, channel state information reporting, or a combination thereof for a high-speed user equipment. In some embodiments, the remote unit 102 may receive a channel state information measurement configuration based on at least one reference signal resource with at least one resource setting. In certain embodiments, the remote unit 102 may generate a set of channel state information feedback parameters based on at least one report setting configuring the user equipment for channel state information reporting. In various embodiments, the remote unit 102 may identify at least one combination of parameters. Each combination of parameters of the at least one combination of parameters includes a report setting of the at least one report setting and a resource setting of the at least one resource setting, and each combination of parameters corresponds to a channel state information feedback report format. In some embodiments, the remote unit 102 may transmit a set of at least one channel state information report of the plurality of channel state information reports to a network. Each channel state information report of the at least one channel state information report: corresponds to a configuration mode of a plurality of configuration modes, wherein the plurality of configuration modes comprises a primary configuration mode and a secondary configuration mode; includes at least one type of a codebook configured via a codebook configuration; and includes at least one channel state information part. Accordingly, the remote unit 102 may be used for configuring a channel state information report.

In certain embodiments, a network unit 104 may transmit an indication of channel state information configuration measurement, channel state information reporting, or a combination thereof for a high-speed user equipment. In some embodiments, the network unit 104 may transmit a channel state information measurement configuration based on at least one reference signal resource with at least one resource setting. In certain embodiments, the network unit 104 may receive a set of at least one channel state information report of a plurality of channel state information reports. Each channel state information report of the at least one channel state information report: corresponds to a configuration mode of a plurality of configuration modes, wherein the plurality of configuration modes comprises a primary configuration mode and a secondary configuration mode; includes at least one type of a codebook configured via a codebook configuration; and includes at least one channel state information part. Accordingly, the network unit 104 may be used for configuring a channel state information report.

Figure 2:
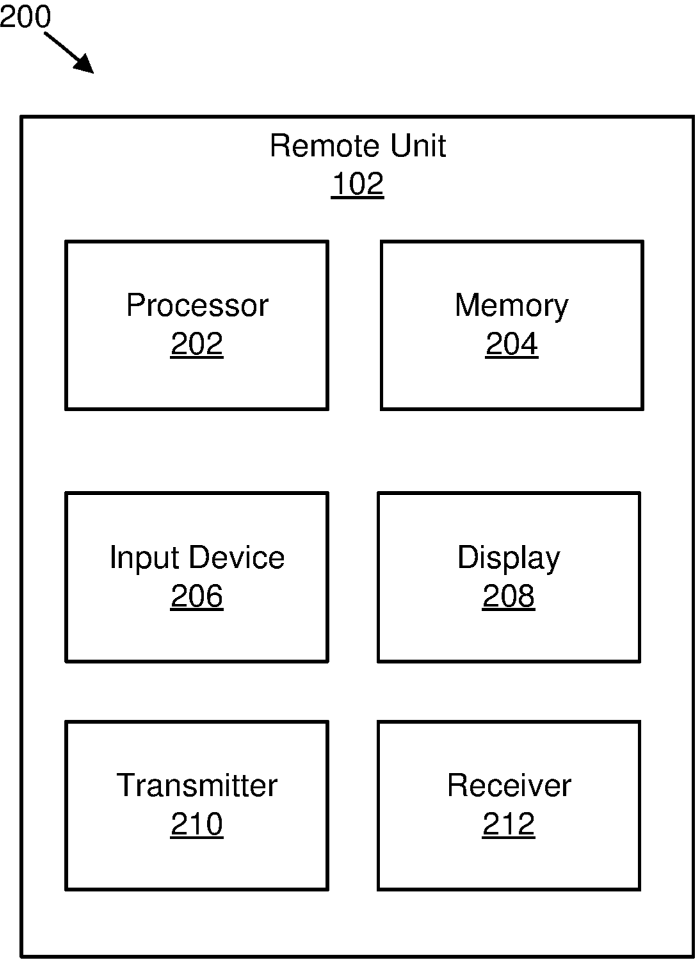
FIG. 2 is a schematic block diagram illustrating one embodiment of an apparatus that may be used for configuring a channel state information report.

FIG. 2 depicts one embodiment of an apparatus 200 that may be used for configuring a channel state information report. The apparatus 200 includes one embodiment of the remote unit 102. Furthermore, the remote unit 102 may include a processor 202, a memory 204, an input device 206, a display 208, a transmitter 210, and a receiver 212. In some embodiments, the input device 206 and the display 208 are combined into a single device, such as a touchscreen. In certain embodiments, the remote unit 102 may not include any input device 206 and/or display 208. In various embodiments, the remote unit 102 may include one or more of the processor 202, the memory 204, the transmitter 210, and the receiver 212, and may not include the input device 206 and/or the display 208.

The processor 202, in one embodiment, may include any known controller capable of executing computer-readable instructions and/or capable of performing logical operations. For example, the processor 202 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 202 executes instructions stored in the memory 204 to perform the methods and routines described herein. The processor 202 is communicatively coupled to the memory 204, the input device 206, the display 208, the transmitter 210, and the receiver 212.

The memory 204, in one embodiment, is a computer readable storage medium. In some embodiments, the memory 204 includes volatile computer storage media. For example, the memory 204 may include a RAM, including dynamic RAM ("DRAM"), synchronous dynamic RAM ("SDRAM"), and/or static RAM ("SRAM"). In some embodiments, the memory 204 includes non-volatile computer storage media. For example, the memory 204 may include a hard disk drive, a flash memory, or any other suitable non-volatile computer storage device. In some embodiments, the memory 204 includes both volatile and non-volatile computer storage media. In some embodiments, the memory 204 also stores program code and related data, such as an operating system or other controller algorithms operating on the remote unit 102.

The input device 206, in one embodiment, may include any known computer input device including a touch panel, a button, a keyboard, a stylus, a microphone, or the like. In some embodiments, the input device 206 may be integrated with the display 208, for example, as a touchscreen or similar touch-sensitive display. In some embodiments, the input device 206 includes a touchscreen such that text may be input using a virtual keyboard displayed on the touchscreen and/or by handwriting on the touchscreen. In some embodiments, the input device 206 includes two or more different devices, such as a keyboard and a touch panel.

The display 208, in one embodiment, may include any known electronically controllable display or display device. The display 208 may be designed to output visual, audible, and/or haptic signals. In some embodiments, the display 208 includes an electronic display capable of outputting visual data to a user. For example, the display 208 may include, but is not limited to, a liquid crystal display ("LCD"), a light emitting diode ("LED") display, an organic light emitting diode ("OLED") display, a projector, or similar display device capable of outputting images, text, or the like to a user. As another, non-limiting, example, the display 208 may include a wearable display such as a smart watch, smart glasses, a heads-up display, or the like. Further, the display 208 may be a component of a smart phone, a personal digital assistant, a television, a table computer, a notebook (laptop) computer, a personal computer, a vehicle dashboard, or the like.

In certain embodiments, the display 208 includes one or more speakers for producing sound. For example, the display 208 may produce an audible alert or notification (e.g., a beep or chime). In some embodiments, the display 208 includes one or more haptic devices for producing vibrations, motion, or other haptic feedback. In some embodiments, all or portions of the display 208 may be integrated with the input device 206. For example, the input device 206 and display 208 may form a touchscreen or similar touch-sensitive display. In other embodiments, the display 208 may be located near the input device 206.

In certain embodiments, the receiver 212: receives an indication of channel state information configuration measurement, channel state information reporting, or a combination thereof for a high-speed user equipment; and receives a channel state information measurement configuration based on at least one reference signal resource with at least one resource setting. In various embodiments, the processor 202: generates a set of channel state information feedback parameters based on at least one report setting configuring the user equipment for channel state information reporting; and identifies at least one combination of parameters. Each combination of parameters of the at least one combination of parameters comprises a report setting of the at least one report setting and a resource setting of the at least one resource setting, and each combination of parameters corresponds to a channel state information feedback report format. In certain embodiments, the transmitter 210 transmits a set of at least one channel state information report of the plurality of channel state information reports to a network. Each channel state information report of the at least one channel state information report: corresponds to a configuration mode of a plurality of configuration modes, wherein the plurality of configuration modes comprises a primary configuration mode and a secondary configuration mode; includes at least one type of a codebook configured via a codebook configuration; and includes at least one channel state information part.

Although only one transmitter 210 and one receiver 212 are illustrated, the remote unit 102 may have any suitable number of transmitters 210 and receivers 212. The transmitter 210 and the receiver 212 may be any suitable type of transmitters and receivers. In one embodiment, the transmitter 210 and the receiver 212 may be part of a transceiver.

Figure 3:
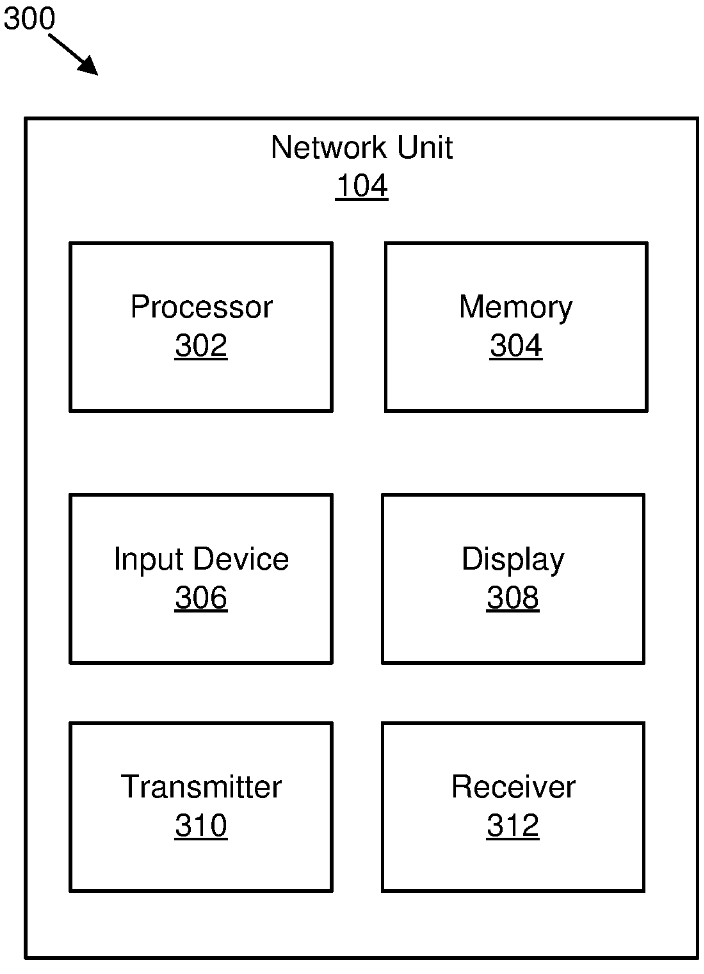
FIG. 3 is a schematic block diagram illustrating one embodiment of an apparatus that may be used for configuring a channel state information report.

FIG. 3 depicts one embodiment of an apparatus 300 that may be used for configuring a channel state information report. The apparatus 300 includes one embodiment of the network unit 104. Furthermore, the network unit 104 may include a processor 302, a memory 304, an input device 306, a display 308, a transmitter 310, and a receiver 312. As may be appreciated, the processor 302, the memory 304, the input device 306, the display 308, the transmitter 310, and the receiver 312 may be substantially similar to the processor 202, the memory 204, the input device 206, the display 208, the transmitter 210, and the receiver 212 of the remote unit 102, respectively.

In certain embodiments, the transmitter 310: transmits an indication of channel state information configuration measurement, channel state information reporting, or a combination thereof for a high-speed user equipment; and transmits a channel state information measurement configuration based on at least one reference signal resource with at least one resource setting. In various embodiments, the receiver 312 receives a set of at least one channel state information report of a plurality of channel state information reports. Each channel state information report of the at least one channel state information report: corresponds to a configuration mode of a plurality of configuration modes, wherein the plurality of configuration modes comprises a primary configuration mode and a secondary configuration mode; includes at least one type of a codebook configured via a codebook configuration; and includes at least one channel state information part.

In certain embodiments, such as for 3GPP new radio ("NR"), channel state information ("CSI") feedback may be reported by a user equipment ("UE") to a network. The CSI feedback may take multiple forms based on a CSI feedback report size, time, and/or frequency granularity. In some embodiments, such as in NR, a high-resolution CSI feedback report (e.g., Type-II) may be used. In such embodiments, spatial and frequency granularities of CSI feedback may be parametrized by the network using a variable number of spatial domain basis indices and frequency domain basis indices. In various embodiments, scenarios in which a UE speed is relatively high (e.g., up to 500 km/h) may exist for high-speed train scenarios. To optimize a tradeoff between a performance and CSI feedback overhead, certain frameworks for CSI measurement and reporting may be made.

In some embodiments, CSI measurement and reporting that is suited for high-Doppler scenarios may be enabled where a relative UE speed is relatively high. In various embodiments, CSI reference signal ("RS") ("CSI-RS") configuration enhancements may help capture a time-varying channel under a high Doppler shift and/or spread. In certain embodiments, both a CSI reporting configuration and a CSI resource configuration may be modified to improve a quality of channel estimation, while maintaining a reasonable tradeoff with CSI feedback overhead and a network and/or UE complexity. In some embodiments, activation and/or deactivation of semi-persistent-like CSI-RS resource configurations may be made. In various embodiments, a new codebook is used that provides CSI feedback in a format that is suitable for high-speed UEs.

Several embodiments are described herein. According to some embodiments, one or more elements or features from one or more embodiments may be combined (e.g., for CSI measurement, feedback generation, and/or reporting) which may reduce overall CSI feedback overhead.

In various embodiments, there may be a certain CSI measurement and reporting time behavior. In such embodiments, a UE is configured by higher layers with one or more CSI-ReportConfig reporting settings for CSI reporting, one or more CSI-ResourceConfig resource settings for CSI measurement, and one or two lists of trigger states (e.g., given by higher layer parameters CSI-AperiodicTriggerStateList and CSI-SemiPersistentOnPUSCH-TriggerStateList). Each trigger state in CSI-AperiodicTriggerStateList may contain a list of a subset of the associated CSI-ReportConfigs indicating resource set identifiers ("IDs") for channel and/or for interference. Each trigger state in CSI-SemiPersistentOnPUSCH-TriggerStateList may contain one or more associated CSI-ReportConfig.

In certain embodiments, there may be an indication of CSI measurement and reporting for high-speed users. In such embodiments, CSI measurement and reporting for high speed devices may be indicated via introducing a new higher layer parameter in one or more CSI-ReportConfig report settings. In one example, the new higher-layer parameter is named HighSpeedCSIEnabled, and if configured in the CSI report setting, the CSI-RS transmission and CSI feedback reporting may follow a CSI measurement and reporting for high-speed framework.

In some embodiments, additional values for the higher-layer parameter reportQuantity representing a CSI report quantity in one or more CSI-ReportConfig CSI report settings may be used to indicate a CSI-RS transmission and CSI feedback reporting that may follow CSI measurement and reporting for the high-speed framework. In one example, additional reporting quantities with Doppler indication (e.g., Doppler indicator ("DI") or high-speed indicator ("HSI")) may be use. For instance, additional values of the CSI report quantity may take on the form 'cri-RI-PMI-CQI-DI', compared with 'cri-RI-PMI-CQI' for frameworks not including high-speed CSI measurement and reporting. Other indications of CSI measurement and reporting under a high-speed framework are not precluded (e.g., via downlink control information ("DCI") triggering, medium access control ("MAC") control element ("CE") signaling, or a UE-assisted indication).

In various embodiments, there may be CSI report settings and resource settings for high-speed users. Different setups of CSI report and resource configurations are described herein. A subset of one setup, or a combination of one or more setups (e.g., including combination of subsets of one or more setups) is not precluded.

In a first embodiment, there is a first CSI report and/or resource setup. In one embodiment of the first embodiment, a UE is configured with at least one CSI report setting CSI-ReportConfig linked with at least two CSI resource settings CSI-ResourceConfig. The first CSI resource setting may be configured with the higher-layer parameter resourceType set to resourceTypeA, and the second CSI resource setting may be configured with the higher-layer parameter resourceType set to resourceTypeB, where each of resourceTypeA and resourceTypeB represents one value in the set of one or more values including at least {'periodic', 'aperiodic', 'semiPersistent'}. In certain embodiments, one codepoint of the CSI resource configuration ID may refer to two CSI resource configurations. In some embodiments, time domain behaviors of both resource settings (e.g., the value of resourceTypeA and resourceTypeB) may be the same, except if the UE is configured with a higher-layer parameter, MAC CE signaling, or a UE-fed back indicator that indicates CSI measurement and reporting under high speed. Each of the CSI resource settings is configured with one or more CSI-RS resource sets. The time-domain behavior of the CSI report setting may be indicated via the higher-layer parameter reportConfigType set to reportTypeA, which represents one value in the set of one or more values including at least {'periodic', 'aperiodic', 'semiPersistentOnPUSCH', 'semiPersistentonPUCCH'}. In various embodiments, more than one CSI resource setting for non-zero-power ("NZP") CSI-RS resource for channel measurement, more than one CSI resource setting for NZP CSI-RS resource for interference measurement, and/or more than one CSI-IM resource for interference measurement may be configured within one CSI resource setting.

In one example, a UE may be configured with one CSI report setting CSI-ReportConfig linked with two CSI resource settings CSI-ResourceConfig. The first CSI resource setting is configured with the higher-layer parameter resourceType set to 'aperiodic', and the second CSI resource setting is configured with the higher-layer parameter resourceType set to 'semiPersistent', with the configuration of the higher-layer parameter HighSpeedCSlenabled in the CSI report setting. Each of the CSI resource settings is configured with one CSI-RS resource set. The time-domain behavior of the CSI report is indicated via the higher-layer parameter reportConfigType set to 'semiPersistentOnPUSCH'. Two CSI resource settings for NZP CSI-RS resource for channel measurement (e.g., resourcesForChannelMeasurement and resourcesForChannelMeasurement-r18), one CSI resource setting for NZP CSI-RS resource for interference measurement (e.g., nzp-CSI-RS-ResourcesForinterference), and one CSI-IM resource for interference measurement (e.g., csi-IM-ResourcesForinterference) may be configured within the CSI resource setting.

An example of abstract syntax notation 1 ("ASN.1") code that corresponds to certain embodiments is provided in FIG. 4 for the CSI-ReportConfig report setting information element ("IE"). Specifically, FIG. 4 is a schematic block diagram illustrating one embodiment of ASN.1 code 400 for CSI report and/or resource setup.

In a second embodiment, there is a second CSI report and/or resource setup. In such embodiments, a UE is configured with at least one CSI report setting CSI-ReportConfig, linked with at least one CSI resource setting CSI-ResourceConfig, where the CSI resource setting may be configured with one higher-layer parameter resourceType, and one codepoint refers to two values resourceTypeA and resourceTypeB, or two higher-layer parameters referring to the time-domain behavior resourceType (e.g., resourceType and resourceTypel) are configured with the values resourceTypeA and resourceTypeB, respectively. Each of resourceTypeA and resourceTypeB represents one value in a set of one or more values including at least {'periodic', 'aperiodic', 'semiPersistent'}. Time domain behaviors of both resource settings (e.g., the value of resourceTypeA and resourceTypeB) may be the same. In some embodiments, it should be noted that only one value for the higher-layer parameter resourceType may be configured in a CSI resource setting, except if the UE is configured with a higher-layer parameter, MAC CE signaling, or a UE-fed back indicator that indicates CSI measurement and reporting under high speed. Each of the CSI resource settings is configured with one or more CSI-RS resource sets. The time-domain behavior of the CSI report setting may be indicated via the higher-layer parameter reportConfigType set to reportTypeA, which represents one value in the set of one or more values including at least {'periodic', 'aperiodic', 'semiPersistentOnPUSCH', 'semiPersistentonPUCCH'}.

In one example, a UE is configured with one CSI report setting CSI-ReportConfig linked with one CSI resource setting CSI-ResourceConfig. The CSI resource setting is configured with the higher-layer parameter resourceType set to 'aperiodic', and a second higher-layer parameter resourceType-r18 set to 'semiPersistent', with the configuration of the higher-layer parameter HighSpeedCSlenabled in the CSI report setting. The CSI resource setting is configured with one CSI-RS resource set. The time-domain behavior of the CSI report is indicated via the higher-layer parameter reportConfigType set to semiPersistentOnPUSCH'.

An example of the ASN.1 code that corresponds to various embodiments is provided in FIG. 5 for the CSI-ResourceConfig resource setting IE. Specifically, FIG. 5 is a schematic block diagram illustrating another embodiment of ASN.1 code 500 for CSI report and/or resource setup.

In a third embodiment, there may be a third CSI report and/or resource setup. In such an embodiment, a UE is configured with at least one CSI report setting CSI-ReportConfig, linked with at least one CSI resource setting CSI-ResourceConfig, where the CSI resource setting may be configured with a higher-layer parameter resourceType configured with a value resourceTypeA, which takes on one value in the set of one or more values including at least {'periodic', 'aperiodic', 'semiPersistent'}. It should be noted that adding one or more additional values in a set of the one or more values representing resourceTypeA is not precluded, which may imply non-uniform time gaps between subsequent CSI-RS resource transmissions. Moreover, the one or more additional values in the set of the one or more values representing resourceTypeA may not be configured, except if the UE is configured with a higher-layer parameter, MAC CE signaling, or a UE-fed back indicator that indicates CSI measurement and reporting under high speed. The CSI resource setting is configured with one or more CSI-RS resource sets. The time-domain behavior of the CSI report setting may be indicated via the higher-layer parameter reportConfigType set to reportTypeA, which represents one value in the set of one or more values including at least {'periodic', 'aperiodic', 'semiPersistentOnPUSCH', 'semiPersistentonPUCCH'}. In various embodiments, adding one or more additional values in the set of the one or more values representing reportTypeA is not precluded, which may imply non-uniform time gaps between subsequent CSI report transmissions. In certain embodiments, one or more additional values in a set of the one or more values representing reportTypeA may not be configured, except if the UE is configured with a higher-layer parameter, MAC CE signaling, or a UE-fed back indicator that represent CSI measurement and reporting under high speed.

In one example, a UE is configured with one CSI report setting CSI-ReportConfig linked with one CSI resource setting CSI-ResourceConfig. The CSI resource setting is configured with the higher-layer parameter resourceType set to 'Custom', where the example value 'Custom' represents a new time-domain behavior. In some embodiments, a higher-layer parameter resourceType may be set to 'Table 1', which may represent a value from a lookup table. The CSI resource setting is configured with one CSI-RS resource set. The time-domain behavior of the CSI report is indicated via the higher-layer parameter reportConfigType set to 'HybridOnPUSCH'. The higher-layer parameter HighSpeedCSIenabled is configured in the CSI report setting.

In various embodiments, there may be report and/or resource types for CSI report and/or resource settings for high-speed users. In such embodiments, additional values (e.g., other than 'periodic', 'aperiodic', 'semi-persistent') may be introduced for a higher-layer parameter resourceType for CSI-ResourceConfig (e.g., 'Hybrid'), where the pattern of the time-domain behavior of the CSI resource setting is set via a pre-determined rule, via DCI triggering, via MAC CE, or via UE feedback (e.g., sent at slots n+k1, n+k2, . . . , n+ks), where k1<k2< . . . <ks for s consecutive CSI-RS transmissions, and the value of s. One or more of the CSI-RS resource set list and the CSI-RS configuration may not be similar across sub-sequent transmissions.

In certain embodiments, there may be additional values (e.g., other than 'periodic', 'aperiodic', 'semiPersistentOnPUSCH', 'semiPersistentOnPUCCH') introduced for a higher-layer parameter reporType for CSI-ReportConfig (e.g., 'HybridOnPUSCH'), where a pattern of the time-domain behavior of the CSI report setting is set via a pre-determined rule, via DCI triggering, via MAC CE, or via UE feedback (e.g., sent at slots n+k1, n+k2, . . . , n+ks), where k1<k2< . . . <ks for s consecutive CSI report transmissions. One or more of the codebook type, the report quantity, the CQI table, the CQI format indicator, and the sub-band size may not be similar across sub-sequent transmissions.

In some embodiments, there may be activation and/or deactivation of CSI reports and CSI-RS. In such embodiments, report settings and resource settings under CSI measurement and reporting for high-speed users may be made based on any embodiment described herein. Other setups for CSI measurement and reporting (e.g., CSI report settings and CSI resource settings) are not precluded for embodiments herein.

In a first set of embodiments, there may be activation and/or deactivation of resource settings. In such embodiments, for CSI-RS resource sets associated with resource settings configured with the higher-layer parameter resourceType set to 'semiPersistent' or a value other than those in the set {'periodic', 'aperiodic'}.

In a first embodiment of the first set of embodiments, activation and/or deactivation commands of resource setting may follow a predetermined process.

In a second embodiment of the first set of embodiments, a resource setting is deactivated with a time threshold (e.g., deactivation may apply starting from a first slot that is after slot $$n + kN_{slot}^{subframe,\mu},$$

where n is based on the slot index at which the resource setting was activated, μ is the SCS configuration for the PUCCH, and k is a positive integer value that is either fixed, higher-layer configured, or indicated by the UE.

In a third embodiment of the first set of embodiments, a resource setting is activated and/or activated with the aid of a UE or UE assistance information (e.g., based on one or more indicator values sent from the UE as part of CSI reporting).

In a fourth embodiment of the first set of embodiments, a resource setting is activated and/or deactivated with a pre-defined rule (e.g., one or more of a value of a reported quantity (e.g., layer 1 ("L1") reference signal received power ("RSRP") ("L1-RSRP"), L1 signal-to-interference and noise ratio ("SINR") ("L1-SINR"), channel quality indicator ("CQI"), rank indicator ("RI"), Doppler-related values reported in the prior CSI reports)). The pre-defined rule may take into account a relative value of one or more of the aforementioned metrics over time (e.g., Δ=CQI(n+k)−CQI(n), where n, k are positive integer values, and CQI(n) represents the value of the CQI reported at a slot index n).

In a fifth embodiment of the first set of embodiments, a resource setting is deactivated if a UE is configured with a report setting deactivation, wherein the resource setting has been configured within the report setting.

In a sixth embodiment of the first set of embodiments, activation and/or deactivation may be determined based on detecting a signal, receiving a message, or receiving a signal and/or message with an SINR or RSRP higher than a threshold from the intended receiver.

In a second set of embodiments, there may be activation and/or deactivation of report settings. In the second set of embodiments, there may be report settings configured with the higher-layer parameter reportConfigType set to 'semiPersistentOnPUSCH', 'semiPersistentOnPUCCH' or a value other than those in the set {'periodic', 'aperiodic'}.

In a first embodiment of the second set of embodiments, a report setting is deactivated with a time threshold (e.g., deactivation may apply starting from the first slot that is after slot $$n + kN_{slot}^{subframe,\mu},$$

where n is based on the slot index at which the report setting was activated, μ is the subcarrier spacing ("SCS") configuration for a physical uplink control channel ("PUCCH"), and k is a positive integer value that is either fixed, higher-layer configured or indicated by the UE.

In a second embodiment of the second set of embodiments, a report setting is activated and/or deactivated with the aid of a UE or UE assistance information (e.g., based on one or more indicator values sent from the UE as part of the CSI reporting).

In a third embodiment of the second set of embodiments, a report setting is activated and/or deactivated with a predefined rule (e.g., one or more of the value of the reported quantity e.g., L1-RSRP, L1-SINR, CQI, RI, Doppler-related values reported in the prior CSI reports). The pre-defined rule may take into account the relative value of one or more of the aforementioned metrics over time (e.g., Δ=CQI(n+k)−CQI(n), where n, k are positive integer values, and CQI(n) represents the value of the CQI reported at a slot index n).

In a fourth embodiment of the second set of embodiments, a report setting is deactivated if a UE is configured with a resource setting deactivation, wherein the resource setting has been configured within the report setting.

In a fifth embodiment of the second set of embodiments, CSI reporting may include event-based CSI feedback. For example, with semi-persistent CSI reporting (e.g., on physical uplink shared channel ("PUCCH") or PUCCH), a UE may skip CSI reporting if an event is not triggered. The event may be triggered if a change in one or more values of metrics (e.g., L1-RSRP, L1-SINR, CQI, RI, Doppler-related values) meets a threshold. The threshold may be configured by higher layers (e.g., received a configuration from a base station) of predefined (e.g., in a specification).

In a sixth embodiment of the second set of embodiments, a first CSI report setting may activate a second CSI report setting. For example, a first CSI report setting may be an aperiodic CSI report which may trigger or activate a second CSI report setting including semi-persistent CSI reporting. In certain embodiments, a first CSI report setting may be a semi-persistent CSI report activated by receiving an activation command (e.g., MAC CE) or receiving an activation DCI (e.g., DCI with cyclic redundancy check ("CRC") scrambled with SP-CSI-RNTI) which may trigger a second CSI report setting comprising aperiodic CSI reporting. The trigger of the second CSI report setting may be indicated in the activation command or the activation DCI associated with the first CSI report setting. In one example, the aperiodic CSI report is transmitted first by the UE followed by the semi-persistent reporting. The timing of the semi-persistent CSI report may be based on the timing of the aperiodic CSI report (e.g., if the aperiodic CSI report is sent in slot n, the semi-persistent CSI report with periodicity p starts in slot n+p). The semi-persistent CSI report may be based or conditioned on the CSI report indicated in the aperiodic CSI report (e.g., semi-persistent CSI report may be a differential CSI report whose reported elements depend on the values reported in the aperiodic CSI report).

In a seventh embodiment of the second set of embodiments, activation and/or deactivation may be determined based on a Doppler measurement. The Doppler measurement may be based on a CSI-RS or a synchronization signal from the gNB.

In some embodiments, there may be CSI reporting for high-speed users. Under the CSI measurement and reporting framework for high-speed users, it may be beneficial that the UE feeds back different CSI structures across time. The UE may be configured with one or more report settings as discussed herein. Without loss of generality, a codebook may be transmitted in two different modes. A case where a codebook can have more than two modes is not precluded. In various embodiments, there may be primary and secondary codebook modes. For instance, CSI feedback corresponding to a primary codebook mode may be followed by one or more CSI feedback instances corresponding to a secondary codebook mode. Several embodiments are described herein. According to various embodiments, one or more elements or features from one or more of embodiments herein may be combined (e.g., codebook type and codebook content under one or more of the primary and secondary codebook modes). In some examples, a codebook mode may include a codebook type and CSI feedback content.

In a third set of embodiments, there may be a codebook type.

In a first embodiment of the third set of embodiments, a codebook for high-speed users is classified as a Type-I codebook (e.g., codebook type set to 'typeI-r18').

In a second embodiment of the third set of embodiments, a codebook for high-speed users is classified as a Type-II codebook (e.g., codebook type set to 'typeII-r18').

In a third embodiment of the third set of embodiments, a codebook for high-speed users is classified as a Type-II port-selection codebook (e.g., codebook type set to 'typeII-PS-r18').

In a fourth embodiment of the third set of embodiments, a codebook for high-speed users is classified as a new codebook class (e.g., Type-III codebook with codebook type set to 'typeIII-r18').

In a fourth set of embodiments, there may be an indication of a high-speed codebook.

In a first embodiment of the fourth set of embodiments, an indicator may be included in a CSI part 1 that indicates whether the CSI feedback is based on primary or secondary codebook modes. In one example, a one-bit indicator, 'CSI-mode' is set to a first value such as '1' if the CSI feedback is in the primary codebook mode, whereas the indicator 'CSImode' is set to a second value such as '0' if the CSI feedback is in the secondary codebook mode.

In a second embodiment of the fourth set of embodiments, a codebook mode is inferred from a CQI reporting. In a first example, the CSI feedback is in a secondary codebook mode if a user is configured with reporting CQI (e.g., the user is configured with a report quantity that is set to a value including 'CQI', but no CQI is reported in CSI part 1 of the CSI feedback). The CSI feedback is in the primary codebook mode if the user is configured with reporting CQI (e.g., the user is configured with a report quantity that is set to a value including 'CQI' with the specified CQI reported in its configured format). In a second example, the CSI feedback is in the secondary codebook mode if the user is configured with reporting sub-band CQI (e.g., the user is configured with a CQI format indicator 'cqi-Format-Indicator' that is set to 'subbandCQI'); however, only wideband CQI is reported in CSI part 1 (e.g., the CQI feedback is in the 'widebandCQI' format regardless of the value of the CQI format indicator). The CSI feedback is in the primary codebook mode if the CQI (e.g., wideband) feedback is in the same format as that configured by the CQI format indicator (e.g., wideband).

In a third embodiment of the fourth set of embodiments, a codebook mode is inferred from a codebook configuration 'codebookConfig' in a CSI reporting setting (e.g., a higher-layer parameter 'highSpeed-CSI' is included within a codebook configuration). In one example, if 'highSpeed-CSI' is set to 'true', CSI feedback is based on a secondary codebook mode, otherwise it is based on the primary codebook mode.

In a fourth embodiment of the fourth set of embodiments, a codebook mode is inferred from a codebook type 'codebookType' or 'subType' within the codebook type.

In a fifth embodiment of the fourth set of embodiments, a codebook mode is inferred from a CSI-RS resource indicator ("CRI") value. In one example, CSI feedback is in a secondary codebook mode if the CRI value (e.g., if reported) in CSI part 1 is not different from the CRI value (e.g., if reported) in the last CSI feedback report (e.g., most recent CSI feedback report), otherwise the CSI feedback is in the primary codebook mode.

In a fifth set of embodiments, there may be content of CSI feedback for primary and secondary codebook modes. Different embodiments herein that discuss the content of a CSI report corresponding to either a primary codebook mode, a secondary codebook mode, or both, are found herein. Combinations of the elements of one or more embodiments are not precluded.

In a first embodiment of the fifth set of embodiments, CSI feedback for a primary codebook mode includes one or more of the following quantities: 'CRI', 'RI', 'PMI', 'CQI', 'LI', 'SSBRI', 'L1-SINR', 'L1-RSRP'. Additional quantities (e.g., 'DI' for Doppler shift indication) are not precluded.

In a second embodiment of the fifth set of embodiments, a CSI feedback report at least includes one or more of an indicator of a set of beam indices, an indicator of a set of transformed frequency basis indices, indicators of indices of selected coefficients whose coefficient amplitude values are non-zero (or more generally not fixed), indicators of the amplitude values of the selected coefficients, and indicators of the phase values of the selected coefficients.

In a third embodiment of the fifth set of embodiments, a CSI feedback report corresponding to the secondary codebook mode does not include one or more of an indicator of a set of beam indices, an indicator of a set of transformed frequency basis indices, indicators of indices of selected coefficients whose coefficient amplitude values are non-zero (or more generally not fixed), and indicators of the amplitude values of the selected coefficients, even if the CSI reporting setting configures a reporting quantity that includes 'PMI'.

In a fourth embodiment of the fifth set of embodiments, a CSI feedback report corresponding to the secondary codebook mode at least includes one or more of an indicator of an additional set of beam indices relative to the set of beam indices corresponding to a last CSI feedback report (e.g., most recent CSI feedback report) with primary codebook mode, an indicator of an additional set of transformed frequency basis indices relative to the set of transformed frequency basis indices corresponding to the last CSI feedback report with primary codebook mode, indicators of an additional set of indices of selected coefficients with respect to the selected coefficients in the last CSI feedback report with primary codebook mode, additional indicators of the amplitude values of the additional selected coefficients, and additional indicators of the phase values of the additional selected coefficients.

In a fifth embodiment of the fifth set of embodiments, a CSI feedback report corresponding to the secondary codebook mode includes indicators of differential coefficient values (e.g., differential amplitude values with respect to the amplitude values indicated in either the last CSI feedback report or the last CSI feedback report with primary codebook mode).

In a sixth embodiment of the fifth set of embodiments, a set of beam indices selected in a CSI feedback report corresponding to a secondary codebook mode is a subset of (or equal to) a set of beam indices selected in the a CSI feedback report corresponding to a primary codebook mode, wherein the selected beams corresponding to the secondary codebook mode have different oversampling factors compared with that of the beams corresponding to the primary codebook mode.

In a seventh embodiment of the fifth set of embodiments, a set of transformed frequency basis indices selected in a CSI feedback report corresponding to a secondary codebook mode is a subset of the set of transformed frequency basis indices selected in the last CSI feedback report corresponding to a primary codebook mode.

In an eighth embodiment of the fifth set of embodiments, a CSI feedback report includes location information of a UE. In one example, a CSI feedback report corresponding to a secondary codebook mode includes differential location information with respect to a location of the UE at an instant of a last CSI feedback report corresponding to a primary codebook mode.

In a ninth embodiment of the fifth set of embodiments, a rank indicator is included in a CSI feedback report corresponding to a secondary codebook mode. In a first example, the rank indicator corresponding to a secondary codebook mode is a one bit indicator that takes on the value '0' if the rank does not change relative to a last CSI feedback report, and takes on the value '1' if the rank value drops by one (e.g., one fewer transmission layer) relative to the last CSI feedback report. In a second example, the rank indicator corresponding to a secondary codebook mode is a one bit indicator that takes on the value '0' if the rank does not change relative to the last CSI feedback report, and takes on the value '1' if the rank value drops to one.

In a tenth embodiment of the fifth set of embodiments, a CQI indicator is transmitted in CSI part 2 in a CSI feedback report corresponding to a secondary codebook mode. An indicator may be included in CSI part 1 of the CSI feedback report corresponding to the secondary codebook mode to indicate if a CQI is reported and/or to indicate whether a wideband or sub-band CQI is reported in CSI part 2 of the CSI feedback report corresponding to the secondary codebook mode.

In an eleventh embodiment of the fifth set of embodiments, a CRI is not reported in a CSI feedback report corresponding to the secondary codebook mode, even if a UE is configured with a report quantity in a CSI reporting setting 'Codebook-Config' that includes a 'CRI' quantity.

In a twelfth embodiment of the fifth set of embodiments, different parameter combinations are associated with each of the CSI feedback report corresponding to a primary codebook mode and the CSI feedback report corresponding to a secondary codebook mode. It should be noted that a parameter combination may be predefined. Each parameter combination may at least include a set of indicators corresponding to one or more of a number of non-zero coefficients, a number of transformed frequency basis indices, and/or a number of selected beams. In a first example, a UE is configured with two parameter combinations in a codebook type or codebook sub-type corresponding to high-speed UEs. In a second example, the UE is configured with one codepoint corresponding to two parameter combinations in the codebook type or codebook sub-type corresponding to high-speed UEs. In a third example, the UE selects one or more parameter combinations corresponding to the CSI feedback report for one or more of the primary codebook mode and secondary codebook mode. An indication of the selected one or one or more parameter combinations may be indicated in the CSI feedback. It should be noted that a transformed frequency basis index does not preclude a case with trivial transformation.

In some embodiments, there may be codebook mapping to CSI reports. In one embodiment, a codebook is identified by indices reported from one or more CSI reports corresponding to one or more of a primary configuration mode and a secondary configuration mode of a codebook type or codebook sub-type. For instance, an equation used to derive a codebook includes values that are indicated from more than one CSI feedback report.

In one example, if a higher-layer parameter codebookType is set to 'typeII' with the value $N_{PSK}$ configured with the higher-layer parameter phaseAlphabetSize set to '4', and the higher-layer parameter subbandAmplitude set to 'false', a codebook for 1-layer CSI reporting can take on the form:

$$W^{(1)}_{q_{1},q_{2},n_{1},n_{2},p_{1}^{(1)},p_{1}^{(2)},i_{2,1,1}} = \frac{1}{\sqrt{N_1 N_2 \sum_{i=0}^{2L-1} \left(p_{1,i}^{(1)} p_{1,i}^{(2)}\right)^2}} \begin{bmatrix} \sum_{i=0}^{L-1} v_{m_1^{(i)},m_2^{(i)}} p_{1,i}^{(1)} p_{1,i}^{(2)} \varphi_{1,i} \\ \sum_{i=0}^{L-1} v_{m_1^{(i)},m_2^{(i)}} p_{1,i+L}^{(1)} p_{1,i+L}^{(2)} \varphi_{1,i+L} \end{bmatrix},$$

where $$\varphi_{1,i} = e^{j2\pi\left(c_{1,i}^{(t)}+c_{1,i}^{(t+1)}\right)/N_{PSK}}, \text{ and } c_{1,i}^{(t)},\ c_1^{,i(t+1)}$$

represent indicated phase values of non-zero coefficients in beam i reported at the CSI reports with indices t, t+1, respectively, which take on the values {0,1, . . . , NPSK−1}. It should be noted that the index t corresponds to a particular time (e.g., slot index).

In another embodiment, one or more of precoder matrix indicator ("PMI"), CQI, RI, synchronization signal ("SS") and/or physical broadcast channel ("SS/PBCH") block resource index ("SSBRI"), CRI, layer index ("LI"), L1-RSRP, and/or L1-SINR reported as part of a secondary configuration mode of a codebook may refer to a differential value computed with respect to the corresponding PMI, CQI, RI, SSBRI, CRI, LI, L1-RSRP, and/or L1-SINR reported in a prior primary configuration mode of the codebook.

In one example, the CQI index if the higher-layer parameter cqi-FormatIndicator is set to 'widebandCQI' is computed as follows: Wideband CQI value (t+1)=Wideband CQI index (t)+Differential wideband CQI index (t+1), wherein the Wideband CQI index (t) represents the CQI index reported in time index t via CSI feedback with a primary configuration mode, and the Differential wideband CQI index (t+1) represents the differential wideband CQI index reported in time index t+1 via CSI feedback with a secondary configuration mode, with respect to that of the wideband value. The differential wideband CQI index table may take on different values compared with those of the conventional wideband CQI index table.

In a sixth set of embodiments, there may be a DopplerValue indication in a CSI report.

In a first embodiment of the sixth set of embodiments, one or more of the CSI reports may include one or more indicators of a UE speed including indicators of Doppler shift, Doppler spread, the UE speed, and a channel correlation across one or more of space, time, and frequency.

In a second embodiment of the sixth set of embodiments, one or more indicators are reported in a CSI report that represent one or more of the differential values of Doppler shift, Doppler spread, a UE speed, and a channel correlation across one or more of space, time, and frequency, where the differential values are computed with respect to the corresponding values in a CSI report fed back at a prior time (e.g., in a last (e.g., most recent) CSI feedback report).

In a third embodiment of the sixth set of embodiments, one or more indicators are reported in a CSI report that represent one or more differential values of Doppler shift, Doppler spread, UE speed, and a channel correlation across one or more of space, time, and frequency, where the differential values are computed with respect to corresponding values as observed from CSI-RSs transmitted in a prior time (e.g., CSI-RSs corresponding to a last (e.g., most recent) CSI feedback report).

In a fourth embodiment of the sixth set of embodiments, one or more of Doppler shift, Doppler spread, a UE speed, and a channel correlation across one or more of space, time, and frequency take on values from one or more pre-defined codebooks.

In some embodiments, the terms antenna, panel, and antenna panel are used interchangeably. An antenna panel may be hardware that is used for transmitting and/or receiving radio signals at frequencies lower than 6 GHz (e.g., frequency range 1 ("FR1")), or higher than 6 GHz (e.g., frequency range 2 ("FR2") or millimeter wave ("mmWave")). In certain embodiments, an antenna panel may include an array of antenna elements. Each antenna element may be connected to hardware, such as a phase shifter, that enables a control module to apply spatial parameters for transmission and/or reception of signals. The resulting radiation pattern may be called a beam, which may or may not be unimodal and may allow the device to amplify signals that are transmitted or received from spatial directions.

In various embodiments, an antenna panel may or may not be virtualized as an antenna port. An antenna panel may be connected to a baseband processing module through a radio frequency ("RF") chain for each transmission (e.g., egress) and reception (e.g., ingress) direction. A capability of a device in terms of a number of antenna panels, their duplexing capabilities, their beamforming capabilities, and so forth, may or may not be transparent to other devices. In some embodiments, capability information may be communicated via signaling or capability information may be provided to devices without a need for signaling. If information is available to other devices the information may be used for signaling or local decision making.

In some embodiments, a UE antenna panel may be a physical or logical antenna array including a set of antenna elements or antenna ports that share a common or a significant portion of a radio frequency ("RF") chain (e.g., in-phase and/or quadrature ("I/Q") modulator, analog to digital ("A/D") converter, local oscillator, phase shift network). The UE antenna panel or UE panel may be a logical entity with physical UE antennas mapped to the logical entity. The mapping of physical UE antennas to the logical entity may be up to UE implementation. Communicating (e.g., receiving or transmitting) on at least a subset of antenna elements or antenna ports active for radiating energy (e.g., active elements) of an antenna panel may require biasing or powering on of an RF chain which results in current drain or power consumption in a UE associated with the antenna panel (e.g., including power amplifier and/or low noise amplifier ("LNA") power consumption associated with the antenna elements or antenna ports). The phrase "active for radiating energy," as used herein, is not meant to be limited to a transmit function but also encompasses a receive function. Accordingly, an antenna element that is active for radiating energy may be coupled to a transmitter to transmit radio frequency energy or to a receiver to receive radio frequency energy, either simultaneously or sequentially, or may be coupled to a transceiver in general, for performing its intended functionality. Communicating on the active elements of an antenna panel enables generation of radiation patterns or beams.

In certain embodiments, depending on a UE's own implementation, a "UE panel" may have at least one of the following functionalities as an operational role of unit of antenna group to control its transmit ("TX") beam independently, unit of antenna group to control its transmission power independently, and/or unit of antenna group to control its transmission timing independently. The "UE panel" may be transparent to a gNB. For certain conditions, a gNB or network may assume that a mapping between a UE's physical antennas to the logical entity "UE panel" may not be changed. For example, a condition may include until the next update or report from UE or include a duration of time over which the gNB assumes there will be no change to mapping. A UE may report its UE capability with respect to the "UE panel" to the gNB or network. The UE capability may include at least the number of "UE panels." In one embodiment, a UE may support UL transmission from one beam within a panel. With multiple panels, more than one beam (e.g., one beam per panel) may be used for UL transmission. In another embodiment, more than one beam per panel may be supported and/or used for UL transmission.

In some embodiments, an antenna port may be defined such that a channel over which a symbol on the antenna port is conveyed may be inferred from the channel over which another symbol on the same antenna port is conveyed.

In certain embodiments, two antenna ports are said to be quasi co-located ("QCL") if large-scale properties of a channel over which a symbol on one antenna port is conveyed may be inferred from the channel over which a symbol on another antenna port is conveyed. Large-scale properties may include one or more of delay spread, Doppler spread, Doppler shift, average gain, average delay, and/or spatial receive ("RX") parameters. Two antenna ports may be quasi co-located with respect to a subset of the large-scale properties and different subset of large-scale properties may be indicated by a QCL Type. For example, a qcl-Type may take one of the following values: 1) 'QCL-TypeA': {Doppler shift, Doppler spread, average delay, delay spread}; 2) 'QCL-TypeB': {Doppler shift, Doppler spread}; 3) 'QCL-TypeC': {Doppler shift, average delay}; and 4) 'QCL-TypeD': {Spatial Rx parameter}. Other QCL-Types may be defined based on combination of one or large-scale properties.

In various embodiments, spatial RX parameters may include one or more of: angle of arrival ("AoA"), dominant AoA, average AoA, angular spread, power angular spectrum ("PAS") of AoA, average angle of departure ("AoD"), PAS of AoD, transmit and/or receive channel correlation, transmit and/or receive beamforming, and/or spatial channel correlation.

In certain embodiments, QCL-TypeA, QCL-TypeB, and QCL-TypeC may be applicable for all carrier frequencies, but QCL-TypeD may be applicable only in higher carrier frequencies (e.g., mmWave, FR2, and beyond), where the UE may not be able to perform omni-directional transmission (e.g., the UE would need to form beams for directional transmission). For a QCL-TypeD between two reference signals A and B, the reference signal A is considered to be spatially co-located with reference signal B and the UE may assume that the reference signals A and B can be received with the same spatial filter (e.g., with the same RX beamforming weights).

In some embodiments, an "antenna port" may be a logical port that may correspond to a beam (e.g., resulting from beamforming) or may correspond to a physical antenna on a device. In certain embodiments, a physical antenna may map directly to a single antenna port in which an antenna port corresponds to an actual physical antenna. In various embodiments, a set of physical antennas, a subset of physical antennas, an antenna set, an antenna array, or an antenna sub-array may be mapped to one or more antenna ports after applying complex weights and/or a cyclic delay to the signal on each physical antenna. The physical antenna set may have antennas from a single module or panel or from multiple modules or panels. The weights may be fixed as in an antenna virtualization scheme, such as cyclic delay diversity ("CDD"). A procedure used to derive antenna ports from physical antennas may be specific to a device implementation and transparent to other devices.

In certain embodiments, a transmission configuration indicator ("TCI") state ("TCI-state") associated with a target transmission may indicate parameters for configuring a quasi-co-location relationship between the target transmission (e.g., target RS of demodulation ("DM") reference signal ("RS") ("DM-RS") ports of the target transmission during a transmission occasion) and a source reference signal (e.g., synchronization signal block ("SSB"), CSI-RS, and/or sounding reference signal ("SRS")) with respect to quasi co-location type parameters indicated in a corresponding TCI state. The TCI describes which reference signals are used as a QCL source, and what QCL properties may be derived from each reference signal. A device may receive a configuration of a plurality of transmission configuration indicator states for a serving cell for transmissions on the serving cell. In some embodiments, a TCI state includes at least one source RS to provide a reference (e.g., UE assumption) for determining QCL and/or a spatial filter.

In some embodiments, spatial relation information associated with a target transmission may indicate a spatial setting between a target transmission and a reference RS (e.g., SSB, CSI-RS, and/or SRS). For example, a UE may transmit a target transmission with the same spatial domain filter used for receiving a reference RS (e.g., DL RS such as SSB and/or CSI-RS). In another example, a UE may transmit a target transmission with the same spatial domain transmission filter used for the transmission of a RS (e.g., UL RS such as SRS). A UE may receive a configuration of multiple spatial relation information configurations for a serving cell for transmissions on a serving cell.

Figure 6:
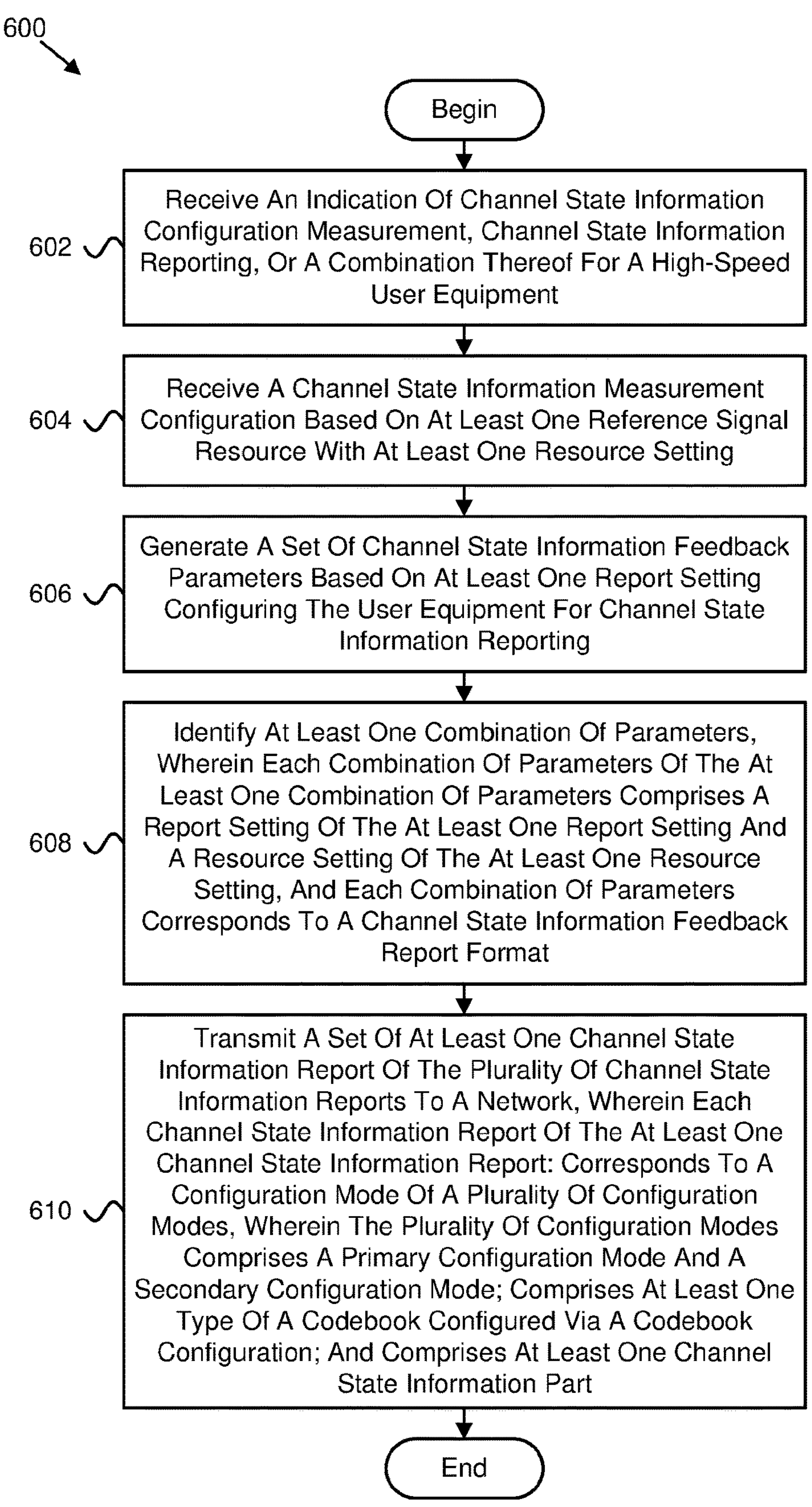
FIG. 6 is a flow chart diagram illustrating one embodiment of a method for configuring a channel state information report.

FIG. 6 is a flow chart diagram illustrating one embodiment of a method 600 for configuring a channel state information report. In some embodiments, the method 600 is performed by an apparatus, such as the remote unit 102. In certain embodiments, the method 600 may be performed by a processor executing program code, for example, a microcontroller, a microprocessor, a CPU, a GPU, an auxiliary processing unit, a FPGA, or the like.

In various embodiments, the method 600 includes receiving 602, at a user equipment, an indication of channel state information configuration measurement, channel state information reporting, or a combination thereof for a high-speed user equipment. In some embodiments, the method 600 includes receiving 604 a channel state information measurement configuration based on at least one reference signal resource with at least one resource setting. In certain embodiments, the method 600 includes generating 606 a set of channel state information feedback parameters based on at least one report setting configuring the user equipment for channel state information reporting. In various embodiments, the method 600 includes identifying 608 at least one combination of parameters. Each combination of parameters of the at least one combination of parameters includes a report setting of the at least one report setting and a resource setting of the at least one resource setting, and each combination of parameters corresponds to a channel state information feedback report format. In some embodiments, the method 600 includes transmitting 610 a set of at least one channel state information report of the plurality of channel state information reports to a network. Each channel state information report of the at least one channel state information report: corresponds to a configuration mode of a plurality of configuration modes, wherein the plurality of configuration modes comprises a primary configuration mode and a secondary configuration mode; includes at least one type of a codebook configured via a codebook configuration; and includes at least one channel state information part.

In certain embodiments, the indication comprises: a high-layer parameter in a channel state information reporting configuration or a codebook configuration that indicates enabling high speed, enabling a Doppler channel state information framework, or a combination thereof; a reporting quantity including a Doppler indication, a mobility indication, a high-speed indication, or some combination thereof; a codebook type corresponding to high-speed channel state information feedback reporting; an indicator in a channel state information report part 1; or some combination thereof. In some embodiments, the at least one report setting configuring the user equipment for channel state information reporting comprises: multiple channel state information resource settings with distinct resource types; one channel state information resource setting with a resource type codepoint corresponding to two resource type values selected from a group comprising: periodic, aperiodic, and semi-persistent; one channel state information resource setting with a hybrid resource type corresponding to non-uniform channel state information reference signal transmission in a time domain; or some combination thereof.

In various embodiments, parameter values corresponding to the secondary configuration mode are computed in a differential manner with respect to equivalent parameter values corresponding to the primary configuration mode. In one embodiment: a primary codebook corresponding to the primary configuration mode comprises: an indicator of a set of beam indices; an indicator of a set of transformed frequency basis indices; indicators of indices of selected coefficients whose coefficient amplitude values are quantized to non-zero values; indicators of amplitude values of the selected coefficients; indicators of phase values of the selected coefficients; or some combination thereof; and a secondary codebook corresponding to the secondary configuration mode does not include: the indicator of the set of beam indices; the indicator of the set of transformed frequency basis indices; and the indicators of the indices of the selected coefficients whose coefficient amplitude values are quantized to non-zero values.

In certain embodiments, parameters values corresponding to the secondary configuration mode are selected from a subset of parameter values corresponding to the primary configuration mode. In some embodiments, a channel state information reference signal resource index configured to be reported for a first channel state information report of the at least one channel state information report corresponding to the primary configuration mode is not reported in a second channel state information report of the at least one channel state information report corresponding to the secondary configuration mode.

In various embodiments, two codebook configurations correspond to channel state information reports of the at least one channel state information report, and the two codebook configurations correspond to the primary configuration mode and the secondary configuration mode. In one embodiment, a primary channel state information report corresponding to the primary configuration mode and a secondary channel state information report corresponding to the secondary configuration mode are reported with: multiple configured report configuration types; one report configuration type codepoint corresponding to report configuration type values, wherein the report configuration types are selected from a group comprising aperiodic, periodic, semi-persistent on a physical uplink shared channel, and semi-persistent on a physical uplink control channel; one report configuration type with a hybrid resource type corresponding to non-uniform channel state information reports fed back in a time domain; or some combination thereof.

In certain embodiments, a selected configuration mode of the plurality of configuration modes is inferred via a configuration mode indicator in a first part of a channel state information report of the at least one channel state information report, and the channel state information report comprises two parts. In some embodiments, location information is included in a first channel state information report of the at least one channel state information report corresponding to a primary configuration mode, and a second channel state information report of the at least one channel state information report corresponding to a secondary configuration mode comprises differential location information with respect to a location estimate at a transmission time of the first channel state information report.

In various embodiments, one codebook corresponding to a precoding matrix comprises parameters from multiple channel state information reports of the at least one channel state information report, and the one codebook comprises at least two configuration modes. In one embodiment, the at least one channel state information report comprises information indicating: a user equipment speed, a Doppler shift, a Doppler spread, channel correlation across space, channel correlation across time, channel correlation across frequency, or some combination thereof.

Figure 7:
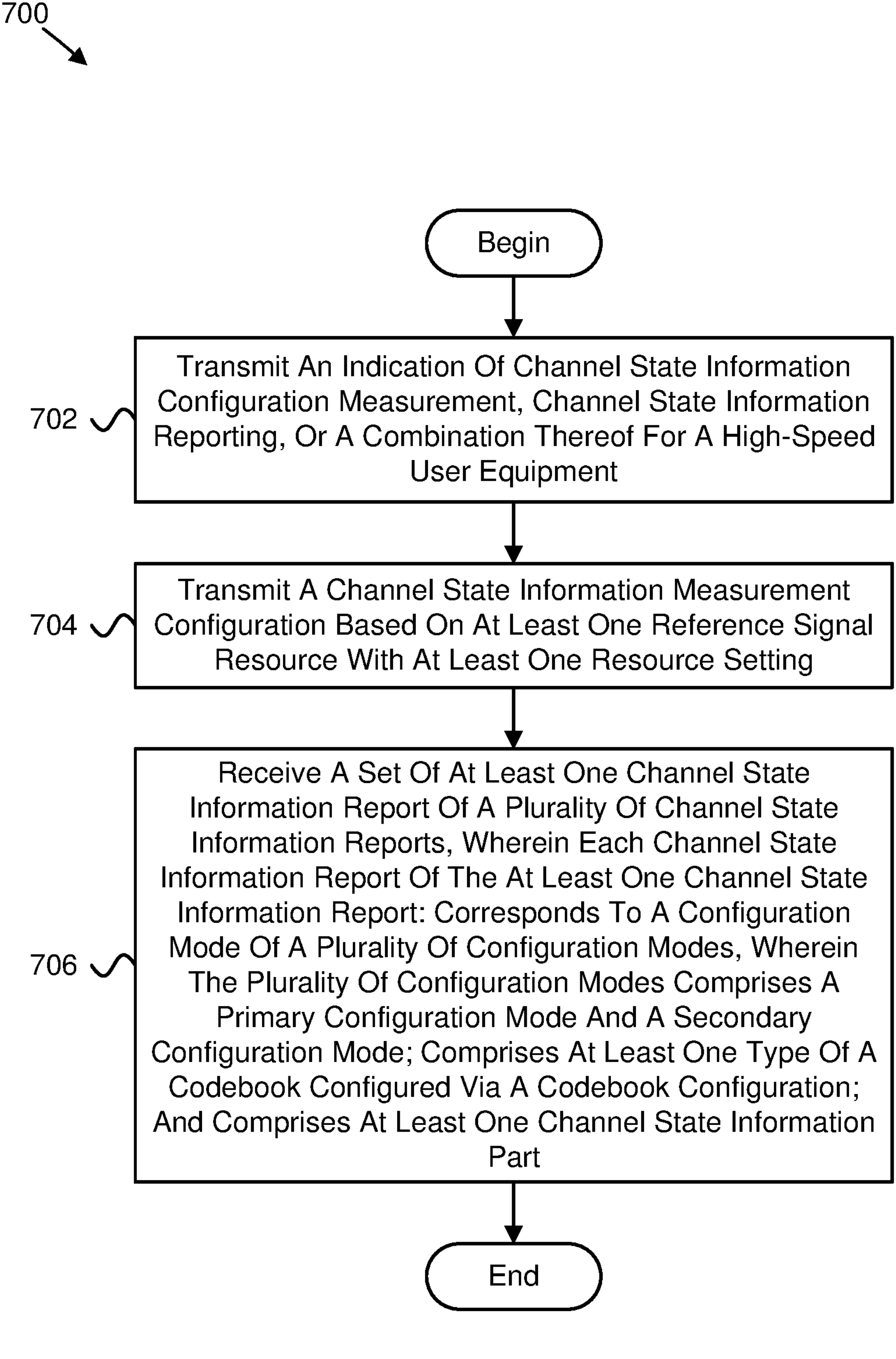
FIG. 7 is a flow chart diagram illustrating another embodiment of a method for configuring a channel state information report.

FIG. 7 is a flow chart diagram illustrating another embodiment of a method 700 for configuring a channel state information report. In some embodiments, the method 700 is performed by an apparatus, such as the network unit 104. In certain embodiments, the method 700 may be performed by a processor executing program code, for example, a microcontroller, a microprocessor, a CPU, a GPU, an auxiliary processing unit, a FPGA, or the like.

In various embodiments, the method 700 includes transmitting 702, at a network device, an indication of channel state information configuration measurement, channel state information reporting, or a combination thereof for a high-speed user equipment. In some embodiments, the method 700 includes transmitting 704 a channel state information measurement configuration based on at least one reference signal resource with at least one resource setting. In certain embodiments, the method 700 includes receiving 706 a set of at least one channel state information report of a plurality of channel state information reports. Each channel state information report of the at least one channel state information report: corresponds to a configuration mode of a plurality of configuration modes, wherein the plurality of configuration modes comprises a primary configuration mode and a secondary configuration mode; includes at least one type of a codebook configured via a codebook configuration; and includes at least one channel state information part.

In certain embodiments, the indication comprises: a high-layer parameter in a channel state information reporting configuration or a codebook configuration that indicates enabling high speed, enabling a Doppler channel state information framework, or a combination thereof; a reporting quantity including a Doppler indication, a mobility indication, a high-speed indication, or some combination thereof; a codebook type corresponding to high-speed channel state information feedback reporting; an indicator in a channel state information report part 1; or some combination thereof. In some embodiments, the at least one report setting configuring the user equipment for channel state information reporting comprises: multiple channel state information resource settings with distinct resource types; one channel state information resource setting with a resource type codepoint corresponding to two resource type values selected from a group comprising: periodic, aperiodic, and semi-persistent; one channel state information resource setting with a hybrid resource type corresponding to non-uniform channel state information reference signal transmission in a time domain; or some combination thereof.

In various embodiments, parameter values corresponding to the secondary configuration mode are computed in a differential manner with respect to equivalent parameter values corresponding to the primary configuration mode. In one embodiment: a primary codebook corresponding to the primary configuration mode comprises: an indicator of a set of beam indices; an indicator of a set of transformed frequency basis indices; indicators of indices of selected coefficients whose coefficient amplitude values are quantized to non-zero values; indicators of amplitude values of the selected coefficients; indicators of phase values of the selected coefficients; or some combination thereof; and a secondary codebook corresponding to the secondary configuration mode does not include: the indicator of the set of beam indices; the indicator of the set of transformed frequency basis indices; and the indicators of the indices of the selected coefficients whose coefficient amplitude values are quantized to non-zero values.

In certain embodiments, parameters values corresponding to the secondary configuration mode are selected from a subset of parameter values corresponding to the primary configuration mode. In some embodiments, a channel state information reference signal resource index configured to be reported for a first channel state information report of the at least one channel state information report corresponding to the primary configuration mode is not reported in a second channel state information report of the at least one channel state information report corresponding to the secondary configuration mode.

In various embodiments, two codebook configurations correspond to channel state information reports of the at least one channel state information report, and the two codebook configurations correspond to the primary configuration mode and the secondary configuration mode. In one embodiment, a primary channel state information report corresponding to the primary configuration mode and a secondary channel state information report corresponding to the secondary configuration mode are reported with: multiple configured report configuration types; one report configuration type codepoint corresponding to report configuration type values, wherein the report configuration types are selected from a group comprising aperiodic, periodic, semi-persistent on a physical uplink shared channel, and semi-persistent on a physical uplink control channel; one report configuration type with a hybrid resource type corresponding to non-uniform channel state information reports fed back in a time domain; or some combination thereof.

In certain embodiments, a selected configuration mode of the plurality of configuration modes is inferred via a configuration mode indicator in a first part of a channel state information report of the at least one channel state information report, and the channel state information report comprises two parts. In some embodiments, location information is included in a first channel state information report of the at least one channel state information report corresponding to a primary configuration mode, and a second channel state information report of the at least one channel state information report corresponding to a secondary configuration mode comprises differential location information with respect to a location estimate at a transmission time of the first channel state information report.

In various embodiments, one codebook corresponding to a precoding matrix comprises parameters from multiple channel state information reports of the at least one channel state information report, and the one codebook comprises at least two configuration modes. In one embodiment, the at least one channel state information report comprises information indicating: a user equipment speed, a Doppler shift, a Doppler spread, channel correlation across space, channel correlation across time, channel correlation across frequency, or some combination thereof.

In one embodiment, a method of a user equipment comprises: receiving an indication of at least one channel state information resource setting, at least one channel state information reporting setting, or a combination thereof for a high-speed user equipment; receiving the at least one channel state information resource setting, wherein each channel state information resource setting of the at least one channel state information resource setting corresponds to at least one reference signal resource; receiving the at least one channel state information reporting setting; identifying at least one combination of configurations, wherein each combination of configurations of the at least one combination of configurations comprises a channel state information reporting setting of the at least one channel state information reporting setting and a channel state information resource setting of the at least one channel state information resource setting; generating a set of channel state information feedback parameters based on the at least one combination of configurations; and transmitting a set of at least one channel state information report of a plurality of channel state information reports to a network, wherein each channel state information report of the at least one channel state information report: corresponds to a configuration mode of a plurality of configuration modes, wherein the plurality of configuration modes comprises a primary configuration mode and a secondary configuration mode; corresponds to at least one type of a codebook configured via a codebook configuration; comprises the set of channel state information feedback parameters; and comprises at least one channel state information part.

In certain embodiments, the indication comprises: a high-layer parameter in a channel state information reporting configuration or a codebook configuration that indicates enabling high speed, enabling a Doppler channel state information framework, or a combination thereof; a reporting quantity including a Doppler indication, a mobility indication, a high-speed indication, or some combination thereof; a codebook type corresponding to high-speed channel state information feedback reporting; an indicator in a channel state information report part 1; or some combination thereof.

In some embodiments, the at least one channel state information reporting setting configuring the user equipment for channel state information reporting comprises: multiple channel state information resource settings with distinct resource types; one channel state information resource setting with a resource type codepoint corresponding to two resource type values selected from a group comprising: periodic, aperiodic, and semi-persistent; one channel state information resource setting with a hybrid resource type corresponding to non-uniform channel state information reference signal transmission in a time domain; or some combination thereof.

In various embodiments, values of a subset of the set of channel state information feedback parameters corresponding to the secondary configuration mode are computed in a differential manner with respect to values of an equivalent subset of the set of channel state information feedback parameters corresponding to the primary configuration mode.

In one embodiment: the set of channel state information feedback parameters of a primary codebook corresponding to the primary configuration mode comprises: an indicator of a set of beam indices; an indicator of a set of transformed frequency basis indices; indicators of indices of selected coefficients whose coefficient amplitude values are quantized to non-zero values; indicators of amplitude values of the selected coefficients; indicators of phase values of the selected coefficients; an indicator of the at least one combination of configurations; or some combination thereof; and the set of channel state information feedback parameters of a secondary codebook corresponding to the secondary configuration mode does not include: the indicator of the set of beam indices; the indicator of the set of transformed frequency basis indices; and the indicators of the indices of the selected coefficients whose coefficient amplitude values are quantized to non-zero values.

In certain embodiments, a set of possible values corresponding to at least one channel state information feedback parameter corresponding to the secondary configuration mode is a subset of the set of possible values corresponding to at least one equivalent channel state information feedback parameter corresponding to the primary configuration mode.

In some embodiments, a channel state information reference signal resource index configured to be reported for a first channel state information report of the at least one channel state information report corresponding to the primary configuration mode is not reported in a second channel state information report of the at least one channel state information report corresponding to the secondary configuration mode.

In various embodiments, two codebook configurations correspond to channel state information reports of the at least one channel state information report, and the two codebook configurations correspond to the primary configuration mode and the secondary configuration mode.

In one embodiment, a primary channel state information report corresponding to the primary configuration mode and a secondary channel state information report corresponding to the secondary configuration mode are reported with: multiple configured report configuration types; one report configuration type codepoint corresponding to report configuration type values, wherein the report configuration types are selected from a group comprising aperiodic, periodic, semi-persistent on a physical uplink shared channel, and semi-persistent on a physical uplink control channel; one report configuration type with a hybrid resource type corresponding to non-uniform channel state information reports fed back in a time domain; or some combination thereof.

In certain embodiments, a selected configuration mode of the plurality of configuration modes is inferred via a configuration mode indicator in a first part of a channel state information report of the at least one channel state information report, and the channel state information report comprises two parts.

In some embodiments, location information is included in a first channel state information report of the at least one channel state information report corresponding to a primary configuration mode, and a second channel state information report of the at least one channel state information report corresponding to a secondary configuration mode comprises differential location information with respect to a location estimate at a transmission time of the first channel state information report.

In various embodiments, one codebook corresponding to a precoding matrix comprises parameters from multiple channel state information reports of the at least one channel state information report, and the one codebook comprises at least two configuration modes.

In one embodiment, the at least one channel state information report comprises information indicating: a user equipment speed, a Doppler shift, a Doppler spread, channel correlation across space, channel correlation across time, channel correlation across frequency, or some combination thereof.

In one embodiment, an apparatus comprises a user equipment. The apparatus further comprises: a receiver that: receives an indication of at least one channel state information resource setting, at least one channel state information reporting setting, or a combination thereof for a high-speed user equipment; receives the at least one channel state information resource setting, wherein each channel state information resource setting of the at least one channel state information resource setting corresponds to at least one reference signal resource; and receiving the at least one channel state information reporting setting; a processor that: identifies at least one combination of configurations, wherein each combination of configurations of the at least one combination of configurations comprises a channel state information reporting setting of the at least one channel state information reporting setting and a channel state information resource setting of the at least one channel state information resource setting; and generates a set of channel state information feedback parameters based on the at least one combination of configurations; and a transmitter that transmits a set of at least one channel state information report of a plurality of channel state information reports to a network, wherein each channel state information report of the at least one channel state information report: corresponds to a configuration mode of a plurality of configuration modes, wherein the plurality of configuration modes comprises a primary configuration mode and a secondary configuration mode; corresponds to at least one type of a codebook configured via a codebook configuration; comprises the set of channel state information feedback parameters; and comprises at least one channel state information part.

In certain embodiments, the indication comprises: a high-layer parameter in a channel state information reporting configuration or a codebook configuration that indicates enabling high speed, enabling a Doppler channel state information framework, or a combination thereof; a reporting quantity including a Doppler indication, a mobility indication, a high-speed indication, or some combination thereof; a codebook type corresponding to high-speed channel state information feedback reporting; an indicator in a channel state information report part 1; or some combination thereof.

In some embodiments, the at least one channel state information reporting setting configuring the user equipment for channel state information reporting comprises: multiple channel state information resource settings with distinct resource types; one channel state information resource setting with a resource type codepoint corresponding to two resource type values selected from a group comprising: periodic, aperiodic, and semi-persistent; one channel state information resource setting with a hybrid resource type corresponding to non-uniform channel state information reference signal transmission in a time domain; or some combination thereof.

In various embodiments, values of a subset of the set of channel state information feedback parameters corresponding to the secondary configuration mode are computed in a differential manner with respect to values of an equivalent subset of the set of channel state information feedback parameters corresponding to the primary configuration mode.

In one embodiment: the set of channel state information feedback parameters of a primary codebook corresponding to the primary configuration mode comprises: an indicator of a set of beam indices; an indicator of a set of transformed frequency basis indices; indicators of indices of selected coefficients whose coefficient amplitude values are quantized to non-zero values; indicators of amplitude values of the selected coefficients; indicators of phase values of the selected coefficients; an indicator of the at least one combination of configurations; or some combination thereof; and the set of channel state information feedback parameters of a secondary codebook corresponding to the secondary configuration mode does not include: the indicator of the set of beam indices; the indicator of the set of transformed frequency basis indices; and the indicators of the indices of the selected coefficients whose coefficient amplitude values are quantized to non-zero values.

In certain embodiments, a set of possible values corresponding to at least one channel state information feedback parameter corresponding to the secondary configuration mode is a subset of the set of possible values corresponding to at least one equivalent channel state information feedback parameter corresponding to the primary configuration mode.

In some embodiments, a channel state information reference signal resource index configured to be reported for a first channel state information report of the at least one channel state information report corresponding to the primary configuration mode is not reported in a second channel state information report of the at least one channel state information report corresponding to the secondary configuration mode.

In various embodiments, two codebook configurations correspond to channel state information reports of the at least one channel state information report, and the two codebook configurations correspond to the primary configuration mode and the secondary configuration mode.

In one embodiment, a primary channel state information report corresponding to the primary configuration mode and a secondary channel state information report corresponding to the secondary configuration mode are reported with: multiple configured report configuration types; one report configuration type codepoint corresponding to report configuration type values, wherein the report configuration types are selected from a group comprising aperiodic, periodic, semi-persistent on a physical uplink shared channel, and semi-persistent on a physical uplink control channel; one report configuration type with a hybrid resource type corresponding to non-uniform channel state information reports fed back in a time domain; or some combination thereof.

In certain embodiments, a selected configuration mode of the plurality of configuration modes is inferred via a configuration mode indicator in a first part of a channel state information report of the at least one channel state information report, and the channel state information report comprises two parts.

In some embodiments, location information is included in a first channel state information report of the at least one channel state information report corresponding to a primary configuration mode, and a second channel state information report of the at least one channel state information report corresponding to a secondary configuration mode comprises differential location information with respect to a location estimate at a transmission time of the first channel state information report.

In various embodiments, one codebook corresponding to a precoding matrix comprises parameters from multiple channel state information reports of the at least one channel state information report, and the one codebook comprises at least two configuration modes.

In one embodiment, the at least one channel state information report comprises information indicating: a user equipment speed, a Doppler shift, a Doppler spread, channel correlation across space, channel correlation across time, channel correlation across frequency, or some combination thereof.

In one embodiment, a method of a network device comprises: transmitting an indication of at least one channel state information resource setting, at least one channel state information reporting setting, or a combination thereof for a high-speed user equipment; transmitting the at least one channel state information resource setting, wherein each channel state information resource setting of the at least one channel state information resource setting corresponds to at least one reference signal resource; transmitting the at least one channel state information reporting setting; and receiving a set of at least one channel state information report of a plurality of channel state information reports, wherein each channel state information report of the at least one channel state information report: corresponds to a configuration mode of a plurality of configuration modes, wherein the plurality of configuration modes comprises a primary configuration mode and a secondary configuration mode; corresponds to at least one type of a codebook configured via a codebook configuration; comprises the set of channel state information feedback parameters; and comprises at least one channel state information part.

In certain embodiments, the indication comprises: a high-layer parameter in a channel state information reporting configuration or a codebook configuration that indicates enabling high speed, enabling a Doppler channel state information framework, or a combination thereof; a reporting quantity including a Doppler indication, a mobility indication, a high-speed indication, or some combination thereof; a codebook type corresponding to high-speed channel state information feedback reporting; an indicator in a channel state information report part 1; or some combination thereof.

In some embodiments, the at least one channel state information reporting setting configuring the user equipment for channel state information reporting comprises: multiple channel state information resource settings with distinct resource types; one channel state information resource setting with a resource type codepoint corresponding to two resource type values selected from a group comprising: periodic, aperiodic, and semi-persistent; one channel state information resource setting with a hybrid resource type corresponding to non-uniform channel state information reference signal transmission in a time domain; or some combination thereof.

In various embodiments, values of a subset of the set of channel state information feedback parameters corresponding to the secondary configuration mode are computed in a differential manner with respect to values of an equivalent subset of the set of channel state information feedback parameters corresponding to the primary configuration mode.

In one embodiment: the set of channel state information feedback parameters of a primary codebook corresponding to the primary configuration mode comprises: an indicator of a set of beam indices; an indicator of a set of transformed frequency basis indices; indicators of indices of selected coefficients whose coefficient amplitude values are quantized to non-zero values; indicators of amplitude values of the selected coefficients; indicators of phase values of the selected coefficients; an indicator of the at least one combination of configurations; or some combination thereof; and the set of channel state information feedback parameters of a secondary codebook corresponding to the secondary configuration mode does not include: the indicator of the set of beam indices; the indicator of the set of transformed frequency basis indices; and the indicators of the indices of the selected coefficients whose coefficient amplitude values are quantized to non-zero values.

In certain embodiments, a set of possible values corresponding to at least one channel state information feedback parameter corresponding to the secondary configuration mode is a subset of the set of possible values corresponding to at least one equivalent channel state information feedback parameter corresponding to the primary configuration mode.

In some embodiments, a channel state information reference signal resource index configured to be reported for a first channel state information report of the at least one channel state information report corresponding to the primary configuration mode is not reported in a second channel state information report of the at least one channel state information report corresponding to the secondary configuration mode.

In various embodiments, two codebook configurations correspond to channel state information reports of the at least one channel state information report, and the two codebook configurations correspond to the primary configuration mode and the secondary configuration mode.

In one embodiment, a primary channel state information report corresponding to the primary configuration mode and a secondary channel state information report corresponding to the secondary configuration mode are reported with: multiple configured report configuration types; one report configuration type codepoint corresponding to report configuration type values, wherein the report configuration types are selected from a group comprising aperiodic, periodic, semi-persistent on a physical uplink shared channel, and semi-persistent on a physical uplink control channel; one report configuration type with a hybrid resource type corresponding to non-uniform channel state information reports fed back in a time domain; or some combination thereof.

In certain embodiments, a selected configuration mode of the plurality of configuration modes is inferred via a configuration mode indicator in a first part of a channel state information report of the at least one channel state information report, and the channel state information report comprises two parts.

In some embodiments, location information is included in a first channel state information report of the at least one channel state information report corresponding to a primary configuration mode, and a second channel state information report of the at least one channel state information report corresponding to a secondary configuration mode comprises differential location information with respect to a location estimate at a transmission time of the first channel state information report.

In various embodiments, one codebook corresponding to a precoding matrix comprises parameters from multiple channel state information reports of the at least one channel state information report, and the one codebook comprises at least two configuration modes.

In one embodiment, the at least one channel state information report comprises information indicating: a user equipment speed, a Doppler shift, a Doppler spread, channel correlation across space, channel correlation across time, channel correlation across frequency, or some combination thereof.

In one embodiment, an apparatus comprises a network device. The apparatus further comprises: a transmitter that: transmits an indication of at least one channel state information resource setting, at least one channel state information reporting setting, or a combination thereof for a high-speed user equipment; transmits the at least one channel state information resource setting, wherein each channel state information resource setting of the at least one channel state information resource setting corresponds to at least one reference signal resource; and transmits the at least one channel state information reporting setting; and a receiver that receives a set of at least one channel state information report of a plurality of channel state information reports, wherein each channel state information report of the at least one channel state information report: corresponds to a configuration mode of a plurality of configuration modes, wherein the plurality of configuration modes comprises a primary configuration mode and a secondary configuration mode; corresponds to at least one type of a codebook configured via a codebook configuration; comprises the set of channel state information feedback parameters; and comprises at least one channel state information part.

In certain embodiments, the indication comprises: a high-layer parameter in a channel state information reporting configuration or a codebook configuration that indicates enabling high speed, enabling a Doppler channel state information framework, or a combination thereof; a reporting quantity including a Doppler indication, a mobility indication, a high-speed indication, or some combination thereof; a codebook type corresponding to high-speed channel state information feedback reporting; an indicator in a channel state information report part 1; or some combination thereof.

In some embodiments, the at least one channel state information reporting setting configuring the user equipment for channel state information reporting comprises: multiple channel state information resource settings with distinct resource types; one channel state information resource setting with a resource type codepoint corresponding to two resource type values selected from a group comprising: periodic, aperiodic, and semi-persistent; one channel state information resource setting with a hybrid resource type corresponding to non-uniform channel state information reference signal transmission in a time domain; or some combination thereof.

In various embodiments, values of a subset of the set of channel state information feedback parameters corresponding to the secondary configuration mode are computed in a differential manner with respect to values of an equivalent subset of the set of channel state information feedback parameters corresponding to the primary configuration mode.

In one embodiment: the set of channel state information feedback parameters of a primary codebook corresponding to the primary configuration mode comprises: an indicator of a set of beam indices; an indicator of a set of transformed frequency basis indices; indicators of indices of selected coefficients whose coefficient amplitude values are quantized to non-zero values; indicators of amplitude values of the selected coefficients; indicators of phase values of the selected coefficients; an indicator of the at least one combination of configurations; or some combination thereof; and the set of channel state information feedback parameters of a secondary codebook corresponding to the secondary configuration mode does not include: the indicator of the set of beam indices; the indicator of the set of transformed frequency basis indices; and the indicators of the indices of the selected coefficients whose coefficient amplitude values are quantized to non-zero values.

In certain embodiments, a set of possible values corresponding to at least one channel state information feedback parameter corresponding to the secondary configuration mode is a subset of the set of possible values corresponding to at least one equivalent channel state information feedback parameter corresponding to the primary configuration mode.

In some embodiments, a channel state information reference signal resource index configured to be reported for a first channel state information report of the at least one channel state information report corresponding to the primary configuration mode is not reported in a second channel state information report of the at least one channel state information report corresponding to the secondary configuration mode.

In various embodiments, two codebook configurations correspond to channel state information reports of the at least one channel state information report, and the two codebook configurations correspond to the primary configuration mode and the secondary configuration mode.

In one embodiment, a primary channel state information report corresponding to the primary configuration mode and a secondary channel state information report corresponding to the secondary configuration mode are reported with: multiple configured report configuration types; one report configuration type codepoint corresponding to report configuration type values, wherein the report configuration types are selected from a group comprising aperiodic, periodic, semi-persistent on a physical uplink shared channel, and semi-persistent on a physical uplink control channel; one report configuration type with a hybrid resource type corresponding to non-uniform channel state information reports fed back in a time domain; or some combination thereof.

In certain embodiments, a selected configuration mode of the plurality of configuration modes is inferred via a configuration mode indicator in a first part of a channel state information report of the at least one channel state information report, and the channel state information report comprises two parts.

In some embodiments, location information is included in a first channel state information report of the at least one channel state information report corresponding to a primary configuration mode, and a second channel state information report of the at least one channel state information report corresponding to a secondary configuration mode comprises differential location information with respect to a location estimate at a transmission time of the first channel state information report.

In various embodiments, one codebook corresponding to a precoding matrix comprises parameters from multiple channel state information reports of the at least one channel state information report, and the one codebook comprises at least two configuration modes.

In one embodiment, the at least one channel state information report comprises information indicating: a user equipment speed, a Doppler shift, a Doppler spread, channel correlation across space, channel correlation across time, channel correlation across frequency, or some combination thereof.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A user equipment (UE), comprising:

at least one memory; and at least one processor coupled with the at least one memory and configured to cause the UE to:

receive a channel state information (CSI) reporting setting;

receive a CSI resource setting that corresponds to at least one CSI reference signal (CSI-RS) resource;

identify at least one combination of configurations;

generate a set of CSI feedback parameters based on the at least one combination of configurations; and transmit a set of at least one CSI report of a plurality of CSI reports to a network, wherein each CSI report of the at least one CSI report:

comprises a channel quality indicator (CQI) indicating a configuration mode of a plurality of configuration modes, wherein the plurality of configuration modes comprises a first configuration mode and a second configuration mode, and wherein values of a subset of the set of CSI feedback parameters corresponding to the second configuration mode are computed in a differential manner with respect to values of an equivalent subset of the set of CSI feedback parameters corresponding to the first configuration mode;

corresponds to at least one type of a codebook configured via a codebook configuration;

comprises the set of CSI feedback parameters; and comprises at least one CSI part.

2. The UE of claim 1, wherein the CSI reporting setting is associated with:

a high-layer parameter in the CSI reporting setting or a codebook configuration that indicates enabling high speed, enabling a Doppler CSI framework, or a combination thereof;

a report quantity including a Doppler indication, a mobility indication, a high-speed indication, or a combination thereof;

a codebook type corresponding to high-speed CSI feedback reporting;

an indicator in a CSI report part 1;

or a combination thereof.

3. The UE of claim 1, wherein the CSI setting configuring the UE for CSI reporting comprises:

multiple CSI resource settings with distinct resource types;

one CSI resource setting with a resource type codepoint corresponding to two resource type values selected from a group comprising: periodic, aperiodic, and semi-persistent;

one CSI resource setting with a hybrid resource type corresponding to non-uniform CSI-RS transmission in a time domain;

or a combination thereof.

4. The UE of claim 1, wherein:

the set of CSI feedback parameters of a first codebook corresponding to the first configuration mode comprises:

an indicator of a set of beam indices;

an indicator of a set of transformed frequency domain basis indices;

indicators of indices of selected coefficients whose coefficient amplitude values are quantized to non-zero values;

indicators of amplitude values of the selected coefficients;

indicators of phase values of the selected coefficients;

an indicator of the at least one combination of configurations;

or a combination thereof; and the set of CSI feedback parameters of a second codebook corresponding to the second configuration mode does not include:

the indicator of the set of beam indices;

the indicator of the set of transformed frequency domain basis indices; and the indicators of the indices of the selected coefficients whose coefficient amplitude values are quantized to non-zero values.

5. The UE of claim 1, wherein a set of possible values corresponding to at least one CSI feedback parameter corresponding to the second configuration mode is a subset of the set of possible values corresponding to at least one equivalent CSI feedback parameter corresponding to the first configuration mode.

6. The UE of claim 1, wherein a CSI-RS resource index configured to be reported for a first CSI report of the at least one CSI report corresponding to the first configuration mode is not reported in a second CSI report of the at least one CSI report corresponding to the second configuration mode.

7. The UE of claim 1, wherein two codebook configurations correspond to CSI reports of the at least one CSI report, and the two codebook configurations correspond to the first configuration mode and the second configuration mode.

8. The UE of claim 1, wherein a first channel state information report corresponding to the first configuration mode and a secondary CSI report corresponding to the second configuration mode are reported with:

multiple configured report configuration types;

one report configuration type codepoint corresponding to report configuration type values, wherein the report configuration types are selected from a group comprising aperiodic, periodic, semi-persistent on a physical uplink shared channel, and semi-persistent on a physical uplink control channel;

one report configuration type with a hybrid resource type corresponding to non-uniform CSI reports fed back in a time domain;

or a combination thereof.

9. The UE of claim 1, wherein a selected configuration mode of the plurality of configuration modes is inferred via a configuration mode indicator in a first part of a CSI report of the at least one CSI report, and the CSI report comprises two parts.

10. The UE of claim 1, wherein one codebook corresponding to a precoding matrix comprises parameters from multiple CSI reports of the at least one CSI report, and the one codebook comprises at least two configuration modes.

11. The UE of claim 1, wherein the at least one CSI report comprises information indicating: a UE speed, a Doppler shift, a Doppler spread, channel correlation across space, channel correlation across time, channel correlation across frequency, or a combination thereof.

12. The UE of claim 1, wherein each combination of configurations of the at least one combination of configurations comprises a corresponding CSI reporting setting of a plurality of CSI reporting settings and a corresponding CSI resource setting of a plurality of CSI resource settings.

13. A method performed by a user equipment (UE), the method comprising:

receiving a channel state information (CSI) reporting setting;

receiving a CSI resource setting that corresponds to at least one CSI reference signal (CSI-RS) resource; identifying at least one combination of configurations;

generating a set of CSI feedback parameters based on the at least one combination of configurations; and transmitting a set of at least one CSI report of a plurality of CSI reports to a network, wherein each CSI report of the at least one CSI report:

comprises a channel quality indicator (CQI) indicating a configuration mode of a plurality of configuration modes, wherein the plurality of configuration modes comprises a first configuration mode and a second configuration mode, and wherein values of a subset of the set of CSI feedback parameters corresponding to the second configuration mode are computed in a differential manner with respect to values of an equivalent subset of the set of CSI feedback parameters corresponding to the first configuration mode;
corresponds to at least one type of a codebook configured via a codebook configuration;
comprises the set of CSI feedback parameters; and
comprises at least one CSI part.

14. A base station, comprising:
at least one memory; and
at least one processor coupled with the at least one memory and configured to cause the base station to:
transmit a channel state information (CSI) reporting setting;
transmit a CSI resource setting that corresponds to at least one CSI reference signal (CSI-RS) resource;
receive a set of at least one CSI report of a plurality of CSI reports, wherein each CSI report of the at least one CSI report:
comprises a channel quality indicator (CQI) indicating a configuration mode of a plurality of configuration modes, wherein the plurality of configuration modes comprises a first configuration mode and a second configuration mode, and wherein values of a subset of a set of CSI feedback parameters corresponding to the second configuration mode are computed in a differential manner with respect to values of an equivalent subset of the set of CSI feedback parameters corresponding to the first configuration mode;
corresponds to at least one type of a codebook configured via a codebook configuration;
comprises the set of CSI feedback parameters; and
comprises at least one CSI part.

15. A processor for wireless communication, comprising:
at least one controller coupled with at least one memory and configured to cause the processor to:
receive a channel state information (CSI) reporting setting;
receive a CSI that corresponds to at least one CSI reference signal (CSI-RS) resource;
identify at least one combination of configurations;
generate a set of CSI feedback parameters based on the at least one combination of configurations; and
transmit a set of at least one CSI report of a plurality of CSI reports to a network, wherein each CSI report of the at least one CSI report:
comprises a channel quality indicator (CQI) indicating a configuration mode of a plurality of configuration modes, wherein the plurality of configuration modes comprises a first configuration mode and a second configuration mode, and wherein values of a subset of the set of CSI feedback parameters corresponding to the second configuration mode are computed in a differential manner with respect to values of an equivalent subset of the set of CSI feedback parameters corresponding to the first configuration mode;
corresponds to at least one type of a codebook configured via a codebook configuration;
comprises the set of CSI feedback parameters; and
comprises at least one CSI part.

16. The processor of claim 15, wherein the CSI reporting setting is associated with:
a high-layer parameter in the CSI reporting setting or a codebook configuration that indicates enabling high speed, enabling a Doppler CSI framework, or a combination thereof;
a report quantity including a Doppler indication, a mobility indication, a high-speed indication, or a combination thereof;
a codebook type corresponding to high-speed CSI feedback reporting;
an indicator in a CSI report part 1;
or a combination thereof.

17. The processor of claim 15, wherein the CSI setting configuring the processor for CSI reporting comprises:
multiple CSI resource settings with distinct resource types;
one CSI resource setting with a resource type codepoint corresponding to two resource type values selected from a group comprising: periodic, aperiodic, and semi-persistent;
one CSI resource setting with a hybrid resource type corresponding to non-uniform CSI-RS transmission in a time domain;
or a combination thereof.

* * * * *